US008169751B2

(12) United States Patent
Albrecht et al.

(10) Patent No.: US 8,169,751 B2
(45) Date of Patent: May 1, 2012

(54) MAGNETORESISTIVE SENSOR HAVING A STRUCTURE FOR ACTIVATING AND DEACTIVATING ELECTROSTATIC DISCHARGE PREVENTION CIRCUITRY

(75) Inventors: Thomas Robert Albrecht, San Jose, CA (US); Robert E. Fontana, Jr., San Jose, CA (US); Bruce Alvin Gurney, San Rafael, CA (US); Timothy Clark Reiley, San Jose, CA (US); Xiao Z. Wu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1042 days.

(21) Appl. No.: 11/426,908

(22) Filed: Jun. 27, 2006

(65) Prior Publication Data
US 2008/0037182 A1 Feb. 14, 2008

(51) Int. Cl.
*G11B 5/33* (2006.01)
*G11B 5/127* (2006.01)
(52) U.S. Cl. ..................... 360/323; 360/234.5
(58) Field of Classification Search .................. 360/323, 360/234.5
See application file for complete search history.

(56) References Cited

U.S. PATENT DOCUMENTS

| | | | |
|---|---|---|---|
| 3,628,093 A | 12/1971 | Crowley | 317/18 |
| 4,262,274 A | 4/1981 | Howe et al. | 337/320 |
| 5,465,186 A * | 11/1995 | Bajorek et al. | 360/323 |
| 5,491,605 A * | 2/1996 | Hughbanks et al. | 360/323 |
| 5,629,569 A | 5/1997 | Janda | 307/117 |
| 5,759,428 A | 6/1998 | Balamane et al. | 219/121.66 |
| 5,867,888 A | 2/1999 | Voldman et al. | 29/603.12 |
| 6,049,056 A | 4/2000 | Balamane et al. | 219/121.66 |
| 6,233,127 B1 * | 5/2001 | Shimazawa | 360/323 |
| 6,239,685 B1 | 5/2001 | Albrecht et al. | 337/365 |
| 6,310,419 B1 | 10/2001 | Wood | 310/306 |
| 6,377,411 B1 | 4/2002 | Katsumata et al. | 360/46 |
| 6,400,534 B1 | 6/2002 | Klaassen | 360/323 |
| 6,424,505 B1 * | 7/2002 | Lam et al. | 360/323 |
| 6,538,857 B1 | 3/2003 | Doss et al. | 360/323 |
| 6,574,078 B1 | 6/2003 | Voldman | 360/323 |

(Continued)

FOREIGN PATENT DOCUMENTS

GB 20442265 9/1980

OTHER PUBLICATIONS

European Office Action Summary from application No. 07250687.6-2210 mailed on May 11, 2009.

*Primary Examiner* — Brian Miller
(74) *Attorney, Agent, or Firm* — Zilka-Kotab, PC

(57) ABSTRACT

A structure for preventing Electrostatic Discharge (LSD) damage to a magnetoresistive sensor during manufacture. The structure includes a switching element that can be switched off during testing of the sensor and then switched back on to provide ESD shunting to the sensor. The switch can be a thermally activated mechanical relay built onto the slider. The switch could also be a programmable resistor that includes to solid electrolyte sandwiched between first and second electrodes. One of the electrodes functions as an anode. When voltage is applied in a first direction an ion bridge forms across through the electrolyte across electrodes making the resistor conductive. When a voltage is applied in a second direction, the ion bridge recedes and the programmable resistor becomes essentially non-conductive.

3 Claims, 33 Drawing Sheets

U.S. PATENT DOCUMENTS

| | | |
|---|---|---|
| 6,825,489 B2 | 11/2004 | Kozicki ............................ 257/42 |
| 6,865,117 B2 | 3/2005 | Kozicki ..................... 365/189.09 |
| 7,558,014 B1* | 7/2009 | Voo et al. ......................... 360/67 |
| 7,839,607 B2* | 11/2010 | Fontana et al. ........... 360/324.12 |
| 7,885,038 B2* | 2/2011 | Kato et al. .................. 360/234.5 |
| 7,944,648 B2* | 5/2011 | Ohwe ......................... 360/234.5 |
| 2003/0169540 A1* | 9/2003 | Granstrom et al. ............ 360/323 |
| 2003/0210501 A1* | 11/2003 | Voldman ........................ 360/323 |
| 2004/0004792 A1* | 1/2004 | Hasegawa et al. ........ 360/324.12 |
| 2004/0159830 A1* | 8/2004 | Weimer et al. ................... 257/13 |
| 2005/0162785 A1 | 7/2005 | Granstrom et al. ............ 360/323 |
| 2005/0201019 A1 | 9/2005 | Zhu et al. ....................... 360/323 |
| 2006/0044702 A1 | 3/2006 | Ding et al. ..................... 360/323 |
| 2006/0082526 A1* | 4/2006 | Anthony et al. ................. 345/82 |

\* cited by examiner

MAGNETORESISTIVE SENSOR HAVING A STRUCTURE FOR ACTIVATING AND DEACTIVATING ELECTROSTATIC DISCHARGE PREVENTION CIRCUITRY

FIELD OF THE INVENTION

The present invention relates to the prevention of electrostatic discharge in magnetic data recording heads, and more particularly to an electrostatic discharge prevention structure that can be activated and deactivated as needed during manufacture and testing of the magnetic head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in one or more insulation layers (insulation stack), the insulation stack being sandwiched between first and second pole piece layers. A gap is formed between the first and second pole piece layers by a gap layer at an air hearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In current read head designs a spin valve sensor, also referred to as a giant magnetoresistive (GMR) sensor has been employed for sensing magnetic fields from the rotating magnetic disk. A GMR sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering after the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

Other magnetoresistive sensors that can be used in a magnetic write head are tunnel junction sensors, also referred to as tunnel valves, and current perpendicular to plane giant magnetoresistive (CPP GMR) sensors. Extraordinary magnetoresistive sensors have been proposed as well for use in magnetic data recording heads.

Regardless of the type of magnetoresistive sensor used in a magnetic head, a challenge that affects the manufacturability of magnetic heads is the problem of Electrostatic Discharge (ESD). Recording heads can be ruined or badly degraded by stray electrostatic discharge events. Although a variety of solutions have been proposed for preventing electrostatic discharge in a write head, no practical solutions are available that can be employed after slider lapping.

As those skilled in the art will appreciate, sliders having magnetic read/write heads are constructed by a process wherein thousands of read/write heads are constructed on a wafer. This wafer is then sliced into rows. The rows of sliders are lapped to remove a desired amount of material from the cut edge of the row of slider, thereby defining the stripe height of the sensor and forming an air bearing surface on the slider. These rows are later cut into individual sliders.

Previously proposed solutions for preventing electrostatic discharge in a magnetic head have included providing some sort of electrical shunt structure that is removed prior to cutting the wafer into individual sliders. The shunt structure must be removed in order to test the slider (e.g. quasi test) and in order for the sensor to function in the finished disk drive. However, there remains a large risk of ESD damage after testing has been completed, before the slider has been assembled into a finished head gimbal assembly and suspension assembly. To make matters worse, the need for ESD protection is becoming more pronounced with each evolution in the sensitivity of the sensor.

Therefore, there is a strong felt need for a method or structure that can prevent electrostatic discharge (ESD) from damaging a magnetoresistive sensor at various stages of manufacture, even after testing has been completed.

SUMMARY OF THE INVENTION

The present invention provides a structure and circuitry for protecting a magnetoresistive sensor from damage due to electrostatic discharge (ESD). The structure includes circuitry for providing an electrical shunt across the sensor. The circuit can be opened to remove the shunting when testing needs to be done to the sensor, and then can be closed to restore shunting for ESD protection.

The circuit for switching the shunting off and on can include a thermally activated relay. The thermally activated relay can include a heating element that is connected to connection pads such as those provided for Fly Height Control (TFC pads). By applying a voltage across the TFC pads, the heating element heats up the relay, opening the shunt circuit so that testing can be performed on the sensor.

The switching of the shunt circuit could also be provided by a programmable resistor. Such a programmable resistor can be a structure that incorporates a solid state electrolyte sandwiched between first and second electrodes. One of the electrodes can be constructed of a material to act as an anode. When voltage is applied in one direction across the electrodes, an ion bridge forms between the electrodes and the resistor becomes conductive. When voltage is applied in the other direction, the ion bridge breaks down and the resistor becomes essentially non-conductive.

Another type of programmable resistor that can be used in the shunt circuit is a programmable resistor constructed using a phase change material. For example a phase change material can be sandwiched between first and second electrodes. By applying a certain desired heat treatment to the phase change material it can become amorphous and essentially non-conductive. Then, by applying another desired heat treatment the phase change material can be annealed to return to its crystalline state. The heat treatments can be performed electrically by applying a voltage across the resistor or can be performed, for example by directing a laser at the resistor.

An ESD shunt circuit advantageously allows the sensor to be protected much later into the manufacturing and assembly process than has previously been possible. This is because the shunt can be switched off when testing is to be done and the can be switched back on to resume shunting. When shunting is no longer needed (such as after the slider has been assembled into a head gimbal assembly) the circuit lines connecting the switch (thermally activated relay or programmable resistor) to the sensor can be severed such as by laser deletion.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
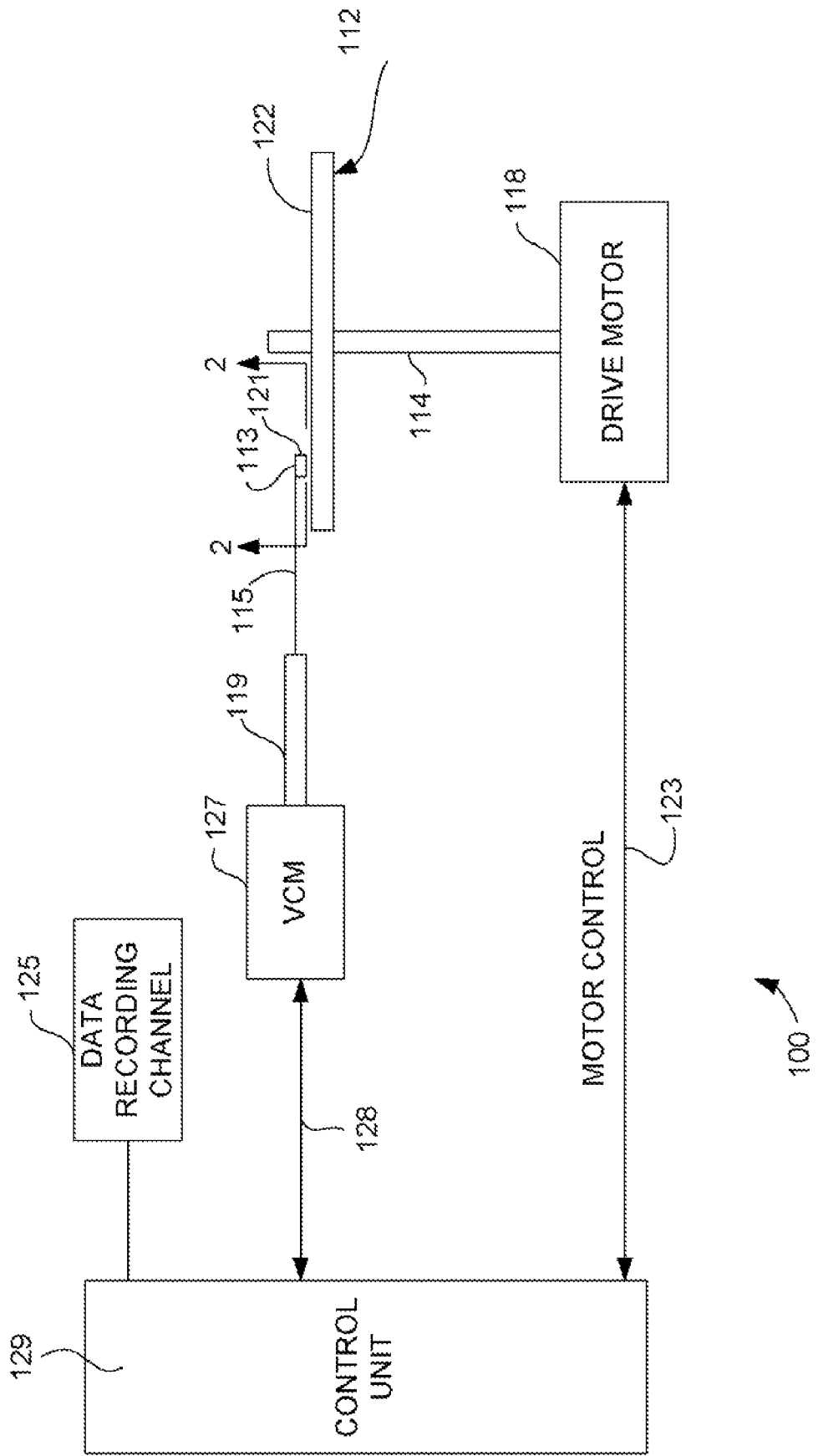
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
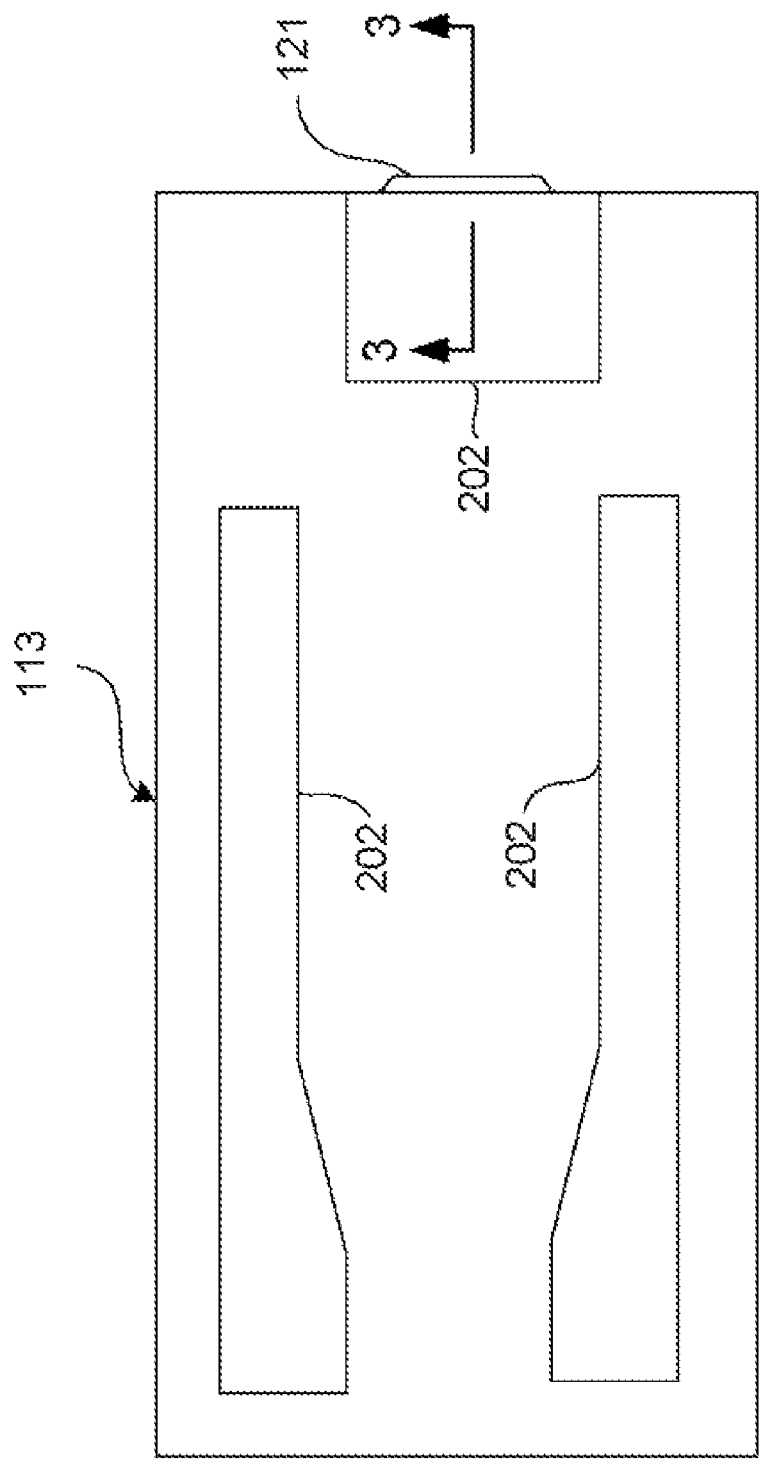
FIG. 2; is an ABS view of a slider, taken from line 2-2 of FIG. 3, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
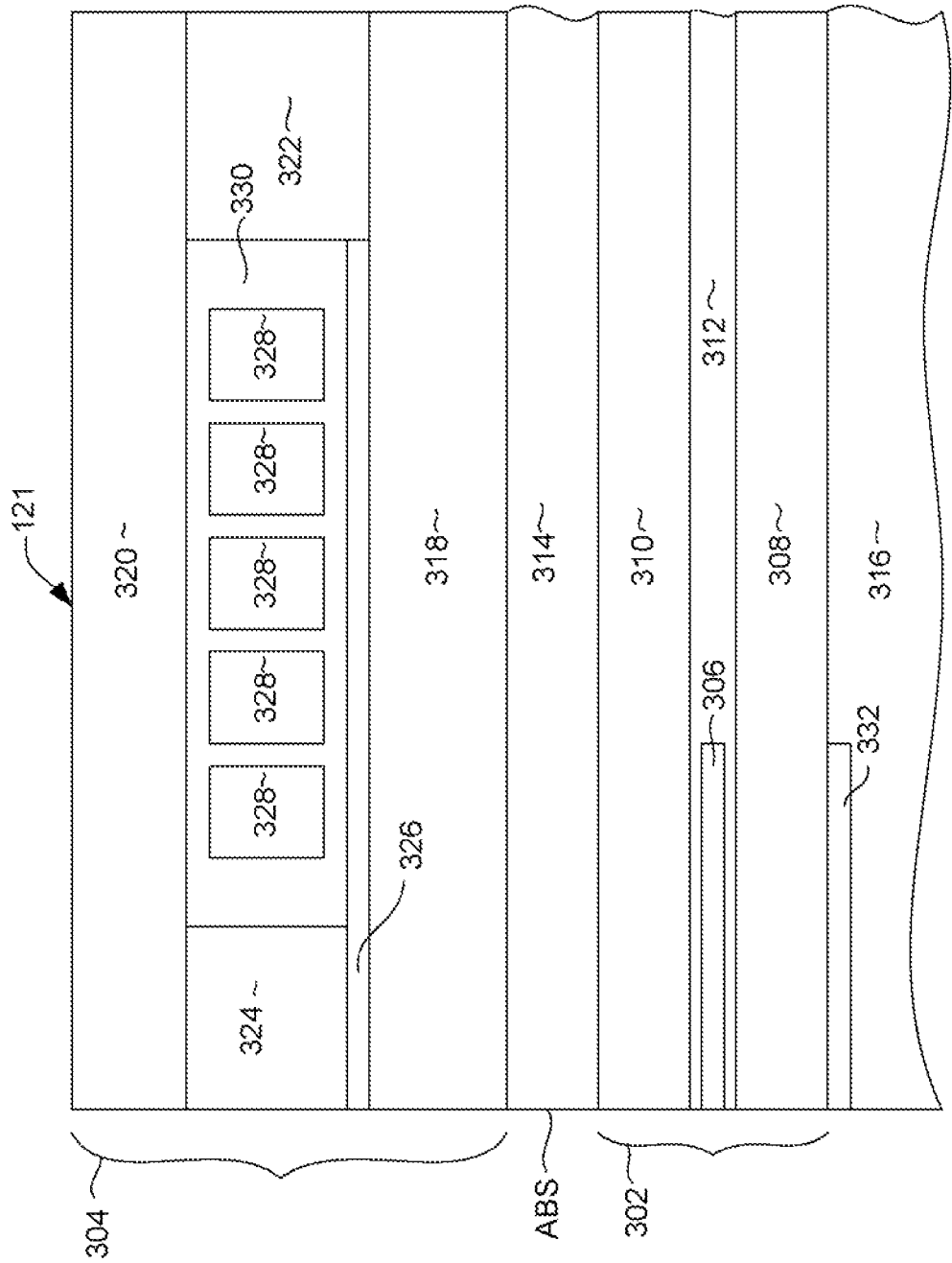
FIG. 3 is a cross sectional view of a magnetic head including a read element, write element and a Thermal Fly-height Control (TFC) heating element.

FIG. 3 shows a cross sectional view of an example of a magnetic read write head 121 such as can be formed on a slider. The head 121 includes a write read element 302 and a write element 304. The read element can include a magnetoresistive sensor 306 sandwiched between first and second magnetic shields 308, 310 and embedded in an insulation layer 312. The write head 304 can be separated from the read head 302 by an insulation layer 314, or can be a merged head design wherein the upper shield 310 functions as a part of the write head 304. The read element and write element are constructed on a substrate 316, which can be, for example titanium carbide or some other hard material and forms the body of the slider 113 described above with respect to FIG. 2.

With continued reference to FIG. 3, the write element includes first and second magnetic poles 318, 320 that are magnetically connected at a back gap 322. A magnetic pedestal 324 may be included at the air bearing surface (ABS) end of the write head, the pedestal being magnetically connected with one of the poles 318, 320. A non-magnetic write gap 326 magnetically separates the poles 318, 320 at the ABS. An electrically conductive write coil 328 passes between the poles 318, 320 and is insulated within an insulation layer 330 such as alumina.

With reference still to FIG. 3, the magnetic head 121 may include a Thermal Fly Height Control structure (TFC), 332. The TFC structure 332 can be in the form of a serpentine shaped (not shown in FIG. 3) layer of material having a desired electrical resistance. The TFC structure 332 can be connected with circuitry for supplying an electrical current that heats the TFC structure 332 a desired amount. This heating can be used to cause thermal expansion of the read and write elements 302, 304, causing them to protrude a desired amount from the ABS. This protrusion can be used to microadjust the effective fly height of the head 121.

Figure 4:
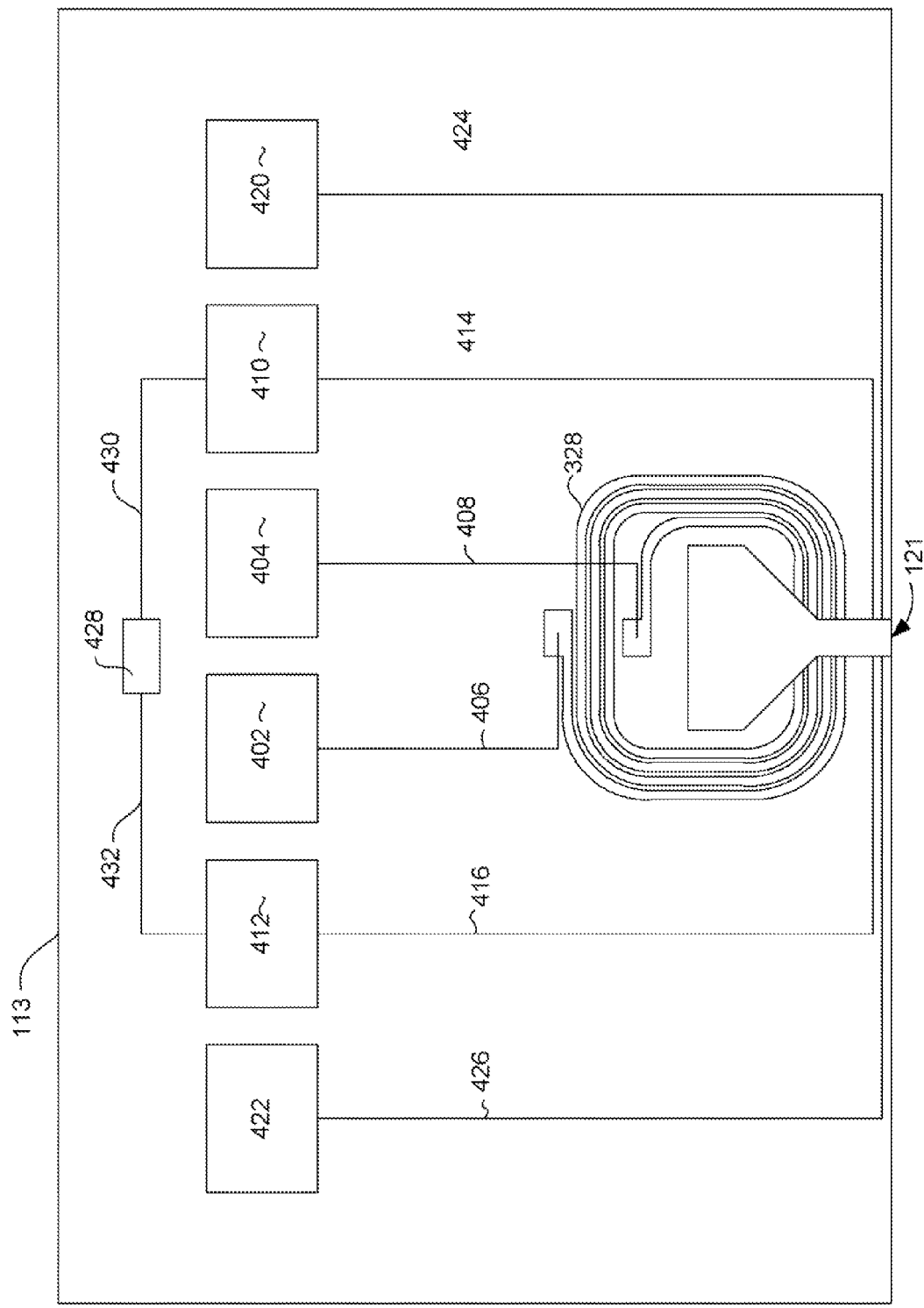
FIG. 4 is a view of an end of a slider showing various contact pads and an ESD shunt circuit.

FIG. 4 shows the end of the slider 113 with a magnetic head 121 formed thereon. The end of the slider 113 can be formed with a series of contact pads for providing electrical contact with the various components of the head 121. For example, a pair of contact pads 402, 404 are connected with the write coil 328 by first and second electrically conductive leads 406, 408, for supplying a write current to the write coil 328. Similarly, a pair of contact pads 410, 412 are connected with the read sensor 306 (FIG. 3) by electrically conductive leads 414, 416. In addition, if a thermal heating element for thermal fly height control 332 (FIG. 3) is provided, the heater 332 can be connected with a pair of contact pads 420, 422 by electrically conductive leads 424, 426.

With continued reference still to FIG. 4, an electrostatic discharge shunt structure 428 is provided. The shunt structure 428 functions to electrically shunt the sensor 306 through connection with the sensor contact pads 410, 412 via leads 430, 432. The shunt structure 428 can be switched to provide either a closed circuit for ESD protection (ie. shunting) or an open circuit to allow the read sensor 306 to be used or tested.

This advantageously allows the shunt structure to remain intact and functional even after the slider has been divided into rows and individual sliders and even after assembly into a head gimbal assembly (HGA).

The above described magnetic head 121 is presented by way of example only in order to illustrate an environment in which an electrostatic discharge protection structure according to the present invention might be embodied. This is by way of example only, as other types of read or write elements could be employed as well. For example, the write element 304 could be a perpendicular write head, rather than the longitudinal design described above. In addition, the structure of the write head, whether longitudinal or perpendicular, could have any number of other designs. Also, the magnetoresistive sensor 306 could be a current in plane giant magnetoresistive sensor (CIP GMR), current perpendicular to plane giant magnetoresistive sensor (CPP GMR), tunnel valve (TMR), extraordinary magnetoresistive element (EMR) or any other magnetoresistive sensor currently available or later developed.

Thermally Activated Mechanical ESD Shunt Relay

Figure 5:
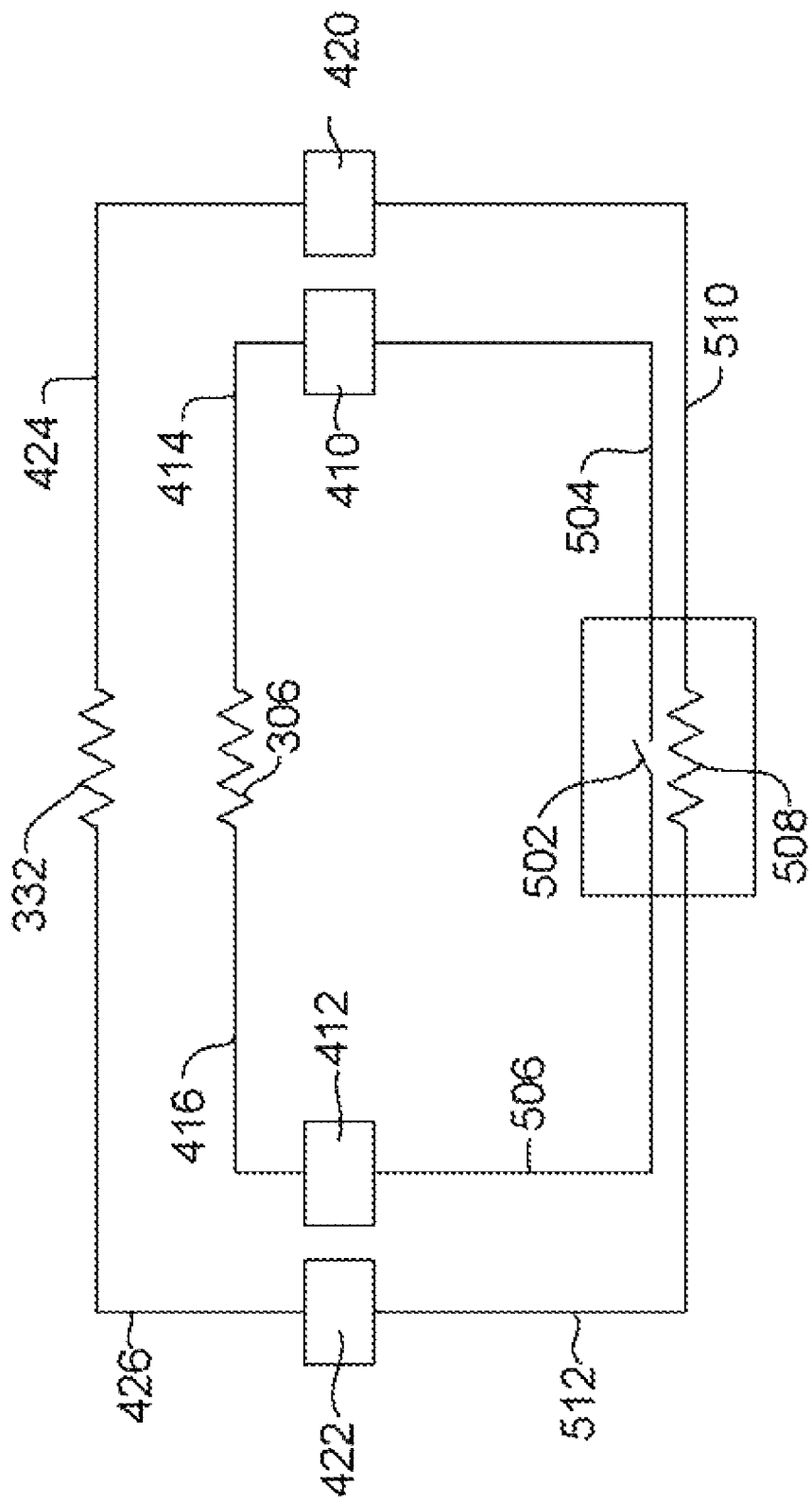
FIG. 5 is a schematic view of an ESD shunt circuit according to an embodiment of the invention.

With reference now to FIG. 5, a schematic illustration of a magnetic head 502 having a thermally activated relay 504 for an electrostatic discharge (ESD) shunt is described. The magnetoresistive sensor 306 is connected with contact pads 410, 412 by the electrically conductive leads 414, 416. The Thermal Fly height Control (TFC) heating element 332 is connected with the contact pads 420, 422 by leads 424, 426.

The ESD shunt structure includes a thermally activated switch structure 502 that is connected with the sensor contact pads 410, 412 by electrically conductive leads 504, 506. The thermally activated switch structure 502 is formed adjacent to a resistive heating element 508 that can be electrically connected with the TFC contact pads 420, 422 by electrically conductive leads 510, 512. The thermally activated switch 502, and heating element 508 together are part of a relay 514 that can electrically shunt the sensor 306, until testing is to be performed, in which case the switch can be opened to remove shunting and allow the sensor to be used.

The switch 502 is biased in a closed position, but can be opened by applying a bias across the TFC contact pads 420, 422. This bias causes the heating element 508 to heat the switch, which opens the switch as will be seen below.

Figure 6:
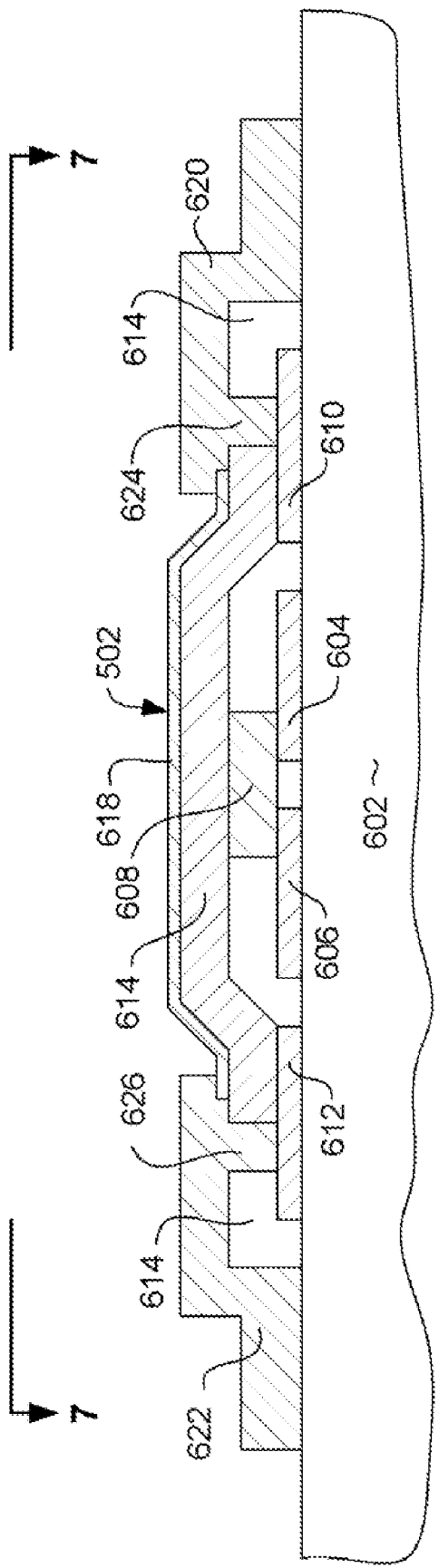
FIG. 6 is a cross sectional view of a thermally activated relay according to an embodiment of the invention.
Figure 7:
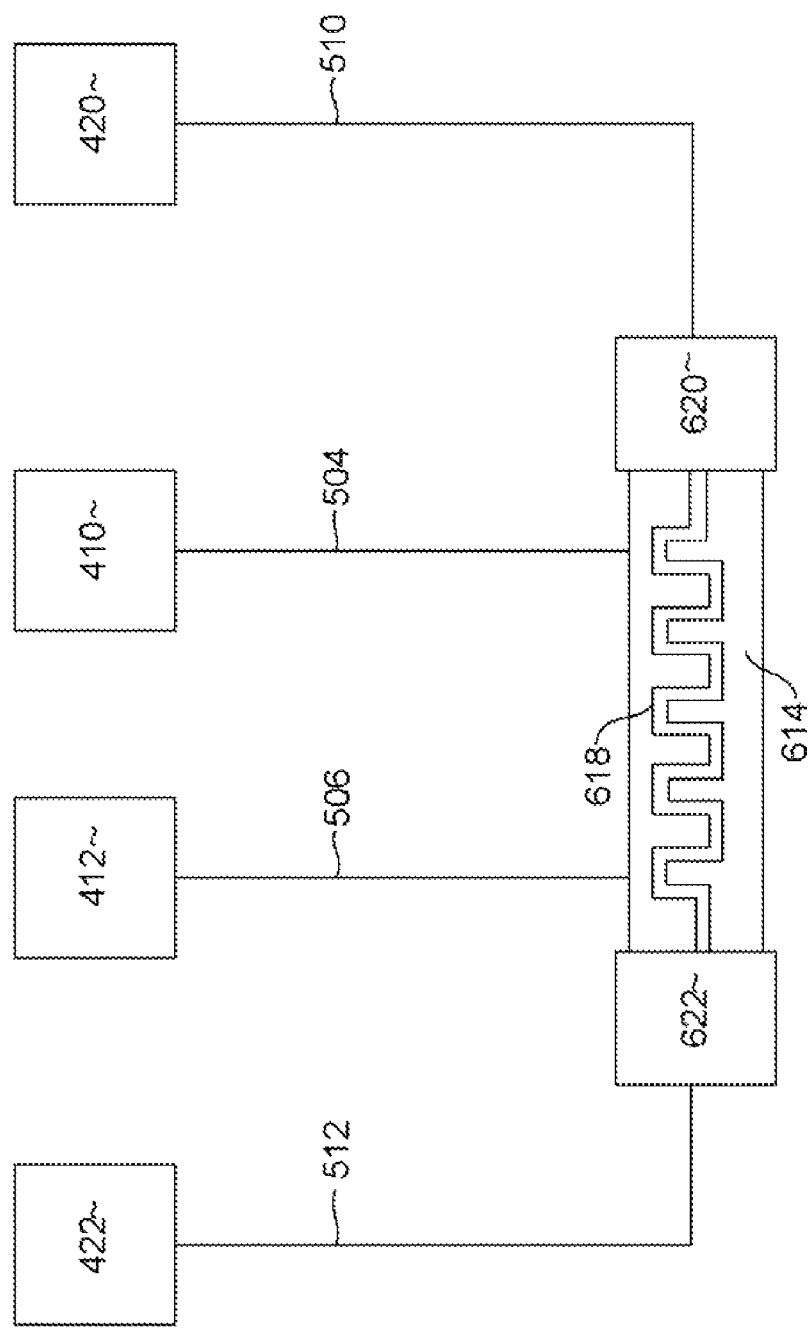
FIG. 7 is a view of the relay taken from line 7-7 of FIG. 6.

With reference now to FIGS. 6 and 7, the structure of a relay 508 according to an embodiment of the invention can be seen in greater detail. The relay 502 is built upon a substrate 602 that can be, the body of the slider 113 (FIG. 2). As shown in FIG. 6, the relay 502 includes first and second contact pads 604, 606 that are electrically connected with the contact pads 410, 412 via leads 504, 506 shown in FIG. 7. An electrically conductive contact bar 608 presses against the inner portions of the contact pads, electrically connecting the two contact pads 604, 606. The contact pads can be constructed of any electrically conductive materials and are preferably constructed of a layer of Ta and a layer of AuNi. The contact bar 608 can also be constructed of various materials and is preferably constructed of AuNi.

The relay 502 also includes outer contact pads 610, 612 that are connected with the TFC contact pads 420, 422 via leads 510, 512 as shown in FIG. 7. The outer contact pads 612, 610 can be constructed of AuNi or some other electrically conductive material and can be deposited in the same deposition step as the inner pads 604, 606 as will be described in greater detail below. A polymer layer 614 extend over the inner contact pads 604, 606, the contact bar 608 and outer contact pads 610, 612. The polymer layer 614 can be construct of various materials, but is preferably constructed of a material that has a low curing temperature (less than 200 degrees C.), good thermal stability at operating temperatures (perhaps up to 250 degrees C.), as well as inertness to later solvent exposure during manufacturing processes that will be described in greater detail below. The polymer layer 614 can be constructed of a negative epoxy photoresist such as SU8®.

With reference to FIG. 7, an electrical resistive heating element 618 is formed on the polymer membrane 614. The resistive heating element 618 can have a serpentine shape as shown in FIG. 7 or could have some other shape as well. The resistor element 618 contacts first and second electrically conductive anchor pads 620, 622 formed over and extending beyond the polymer membrane. As seen in FIG. 6, the polymer layer 614 has holes 624, 626 that allow electrical connection between the resistor 618 and outer contact pads 610, 612. These holes 624, 626 are shown in FIG. 6. The anchor pads 620, 622 (and possibly outer portions of the resistor 618 extend into the holes 624, 626. In this way, the anchor pads provide electrical connection between the resistor 618 and the outer contact pads 610, 612, while also providing a mechanical anchoring function to secure the outer ends of the polymer membrane 614. The anchor pads can be constructed of several electrically conductive materials and are preferably constructed of Ta and Au.

As can be seen with reference to FIGS. 6 and 7, in a quiescent state the ESD shunt relay shunt structure provides electrical shunting of the sensor by providing a closed electrical circuit between the sensor contact pads 410, 414. Current is shunted across the inner contact pads 604, 606 across the contact bar 608. However, when an operator desires to perform testing on the sensor, such as during quasi testing, the operator can open the relay 502 to remove this shunting. This is performed by applying a voltage across the TFC contact pads 420, 422. This voltage generates a current that heats up the resistive heater 618, which in turn heats up the polymer membrane 614. Thermal expansion of the polymer membrane 614 causes the membrane to lift or bow upward. This lifting or bowing lifts the contact bar 608, which is attached to the membrane. This lifting of the contact bar 608 removes electrical contact between the inner contact pads 604, 606, opening the circuit between the sensor pads 410, 412 and temporarily removing the sensor shunting. Once the voltage is removed from the TFC contact pads 420, 422 (such as after testing has been completed) the resistor 618 and membrane 614 cool. The membrane 614, and contact bar 608 remove to their original position where the contact bar 608 is in contact with the inner contact pads 604, 606. ESD shunting is then restored to provide ESD protection to the sensor.

Once the shunt structure 502 is no longer needed (such as after the slider has been assembled into a finished, tested head gimbal assembly) the lead lines 510, 504, 506 and 512 can be cut, such as by laser deletion or a fusible element within each of the lead lines 510, 504, 506, 512 can be included in the circuit, which can be opened under a high current pulse.

Figure 8:
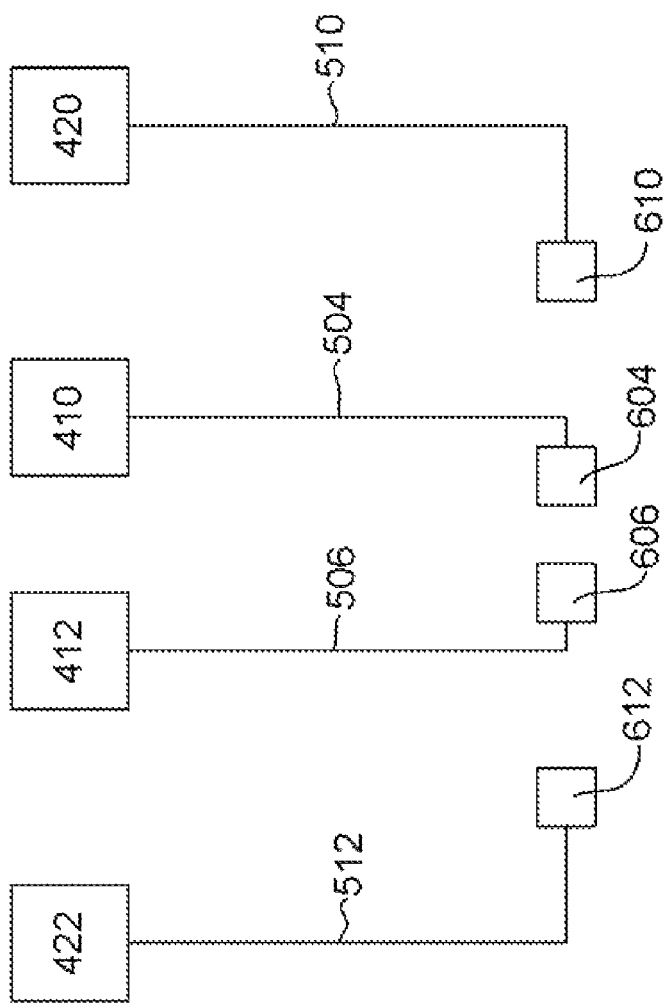
FIGS. 8-15 show the relay of FIGS. 6 and 7 in various intermediate stages of manufacture in order to illustrate a method of manufacturing a thermally activated relay according to an embodiment of the invention.

With reference now to FIGS. 8-14, a method of constructing an ESD shunt relay 502 as discussed above will be described. With particular reference to FIG. 8, the contact pads 410, 412, 420, 422 are formed. These can be constructed of for example Au. A pattern of lead lines 510, 504, 506, 512 as well as inner contact pads 604, 606 and outer contact pads 610, 612 are then formed. The lead lines 504, 506 connect the inner contact pads 604, 606 with the sensor pads 410, 412 and the lead lines 510, 512 connect the outer contact pads 610, 612 with the TFC pads 420, 422. The formation of the leads 504, 506, 510, 512 can be performed by depositing a full film layer of Ta, followed by a foil film layer of Au—Ni. The Ta layer can be deposited to a thickness of, for example, about 20 nm, and the Au—Ni can be deposited to a thickness of, for example, 0.2-0.3 microns. Then a resist mask can be formed, having a pattern corresponding to the leads 504, 506, 510, 512 and pads 604, 606, 610, 612. A material removal process such as ion milling can then be performed to remove portions of the deposited Ta and Au—Ni layers, thereby forming a the leads 504, 506, 510, 512 and pads 604, 606, 610, 612. A layer of, for example, alumina can be deposited and polished back to the AuNi surface, such that the AuNi is roughly coplanar with the rest of the structure.

Figure 9:
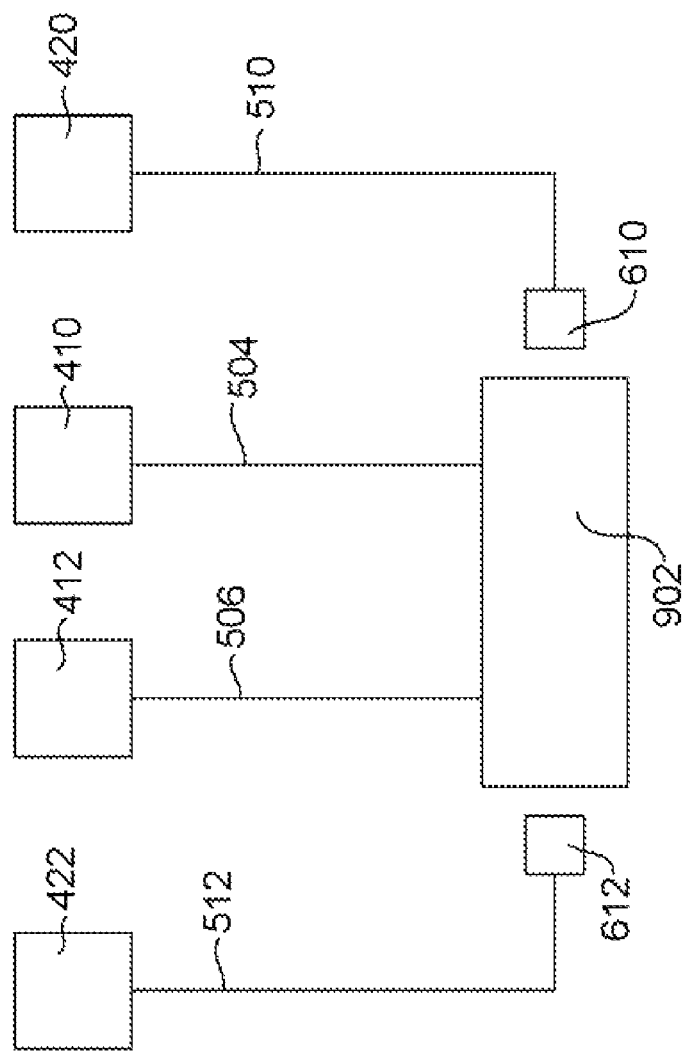
Figure 10:
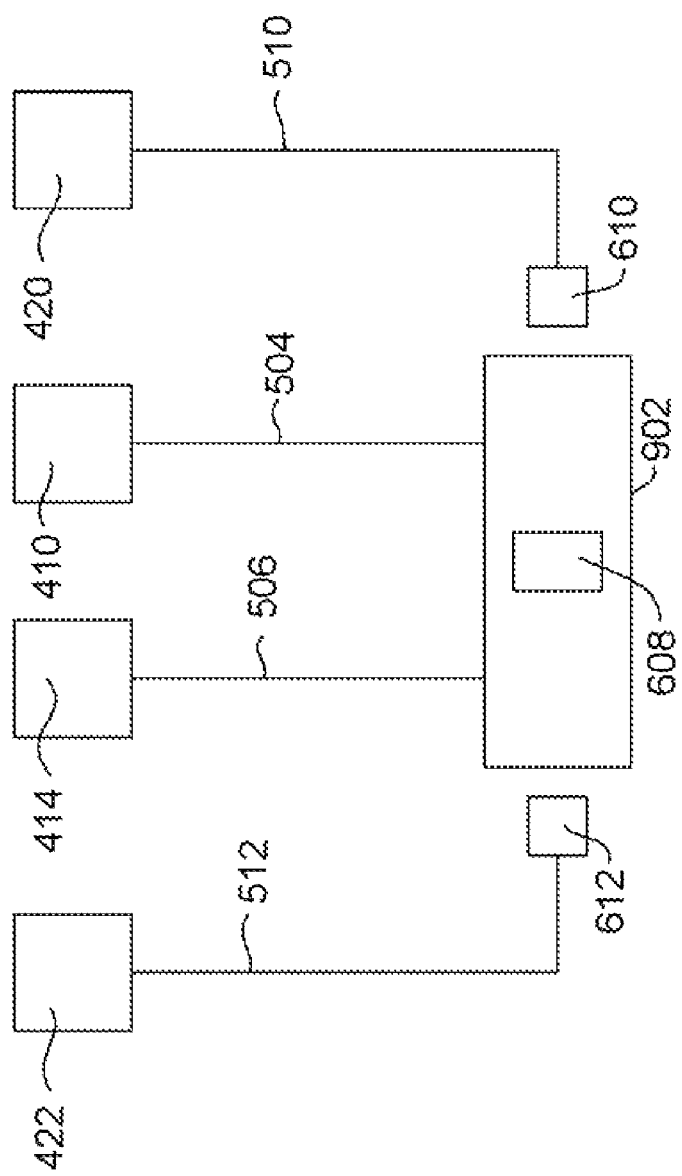

With reference now to FIG. 9, a release layer 902 formed of, for example, Cu is deposited. The release layer 902 is preferably formed to cover the inner contact pads 604, 606, but not the outer contact pads 610, 612. Then, as shown in FIG. 10, the electrically conductive contact bar 608 is formed over the release layer 902. As mentioned above, the contact bar can be constructed of Au—Ni, and can be about 0.2 microns thick.

Figure 11:
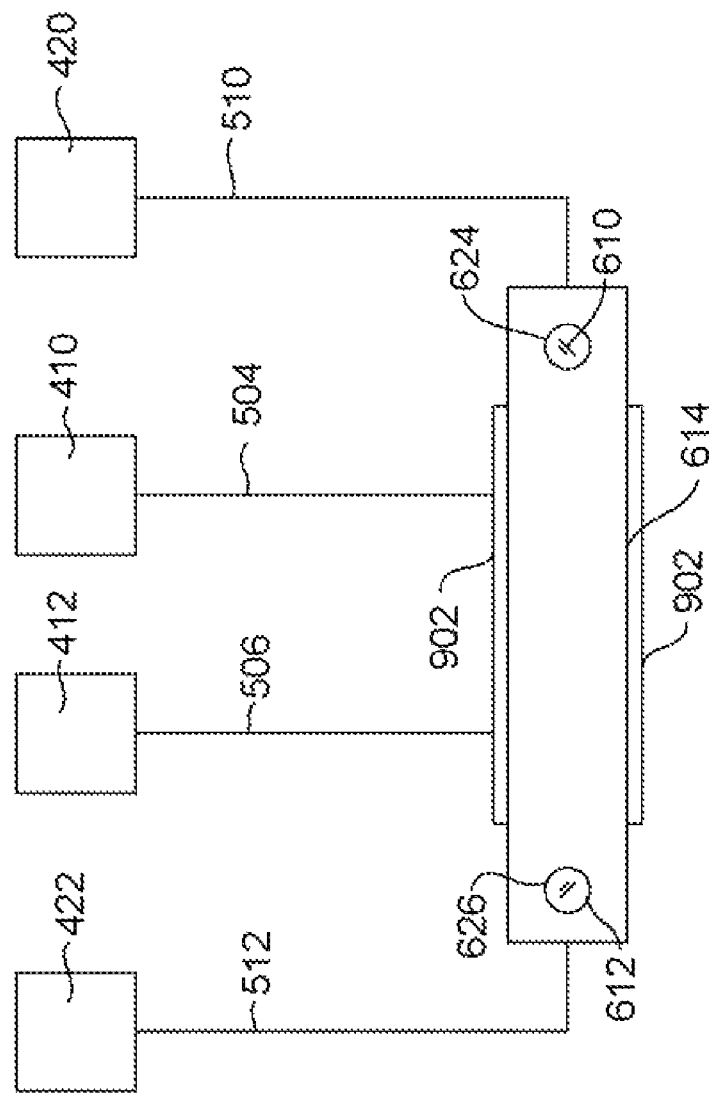

With reference now to FIG. 11, the polymer membrane 614 is formed. As mentioned above, the polymer membrane can be constructed of a material such as a negative photoresist SU8® or some other material having a suitable curing temperature and thermal stability. The polymer membrane 614 is formed such that at least a portion of the edges of the release 902 extend beyond the edges of the polymer membrane 614, allowing a portion of the edges of the release layer 902 exposed. Also, as can be seen in FIG. 11, through holes or vias 624, 626 are formed in the polymer membrane 614. The through holes 624, 626 extend entirely through the membrane 614 to expose the outer contact pads 612, 610 there under. The membrane 614 can be constructed of several materials and is preferably constructed of a flexible material that can be spun on. The material is preferably capable of being photo-imaged, has a low curing temperature (less than 190 degrees C.), has a high coefficient of expansion, high thermal resistance, and is preferably resistant to solvents. As mentioned above, a good candidate material for the membrane material is a layer of SU8® epoxy having a thickness of 4-8 microns. The presence of the Cu release layer 902 protects the sensor from damage during the formation of the membrane 902, if, for example, plasma processing is used in any of the subsequent processing steps.

It should be noted that two-dimensional membranes are also possible, in which case the membrane is anchored at more than two places. This requires attention to the exposure of the release layer, such that the membrane may be released. A two-dimensional membrane would, upon application of the current to the top surface conductor, deform in a way more like a bubble than a bridge.

Figure 12:
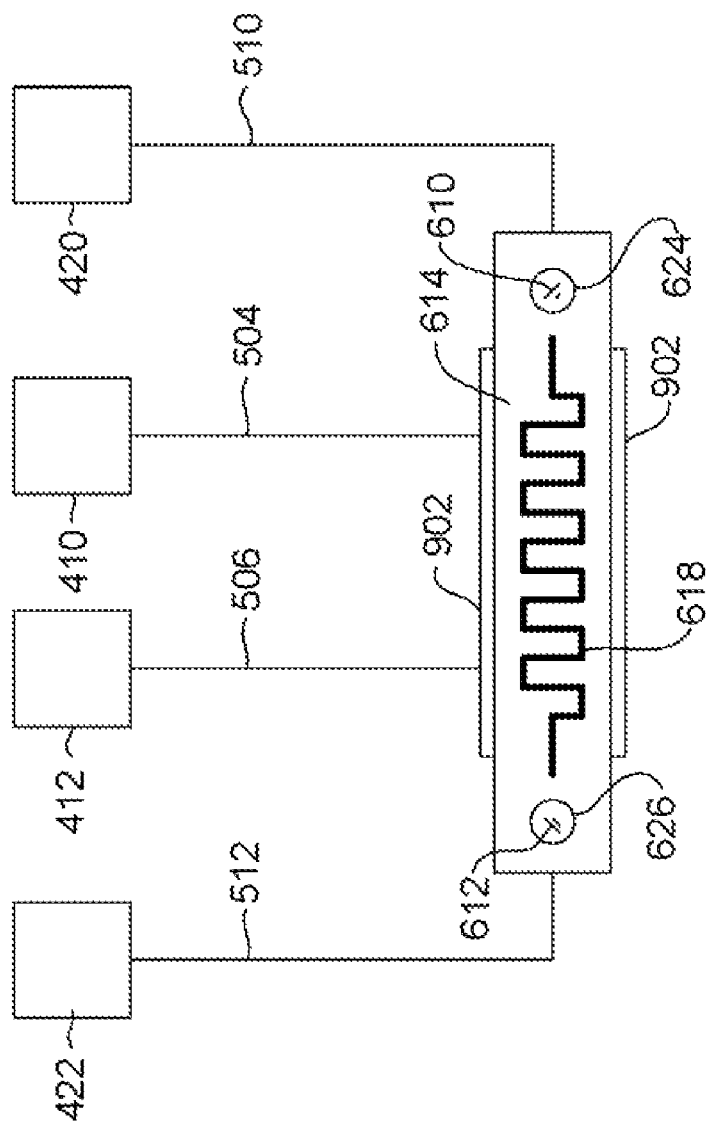

With reference now to FIG. 12, the electrically resistive heating element 618 is formed over the membrane 614. The resistive heating element 618 can be constructed of various materials, but is preferably constructed of a layer of Ta and a layer of Au formed over the Ta layer. The heating element 618 can be formed in a serpentine shape to maximize heating efficiency, and preferably has a thickness of 0.1-0.2 microns, although it could also be some other thickness. The heating element 618 is also partially deposited using deposition conditions that results in the heating element having internal tensile stresses. For example, the heating element can be formed by sputter depositing a variety of materials such as Cr, TiW or Ta under a range of pressure and bias conditions, which results in tensile stress. The tensile stresses may be on the order of one GPa Evaporated or plated materials can also be used to provide a tensile stressed layer within the serpentine heater structure 618. The tensile stresses in the heating element help to maintain the contact pad 608, pressed against the inner contacts 604, 606 (as shown in FIG. 6) when the relay 502 is not being opened. The heating element 618 can be deposited having a resistance of about 50 Ohms or about half the resistance of the TFC 332 (FIG. 3) to ensure limited heating of the TFC during actuation of the relay.

Figure 13:
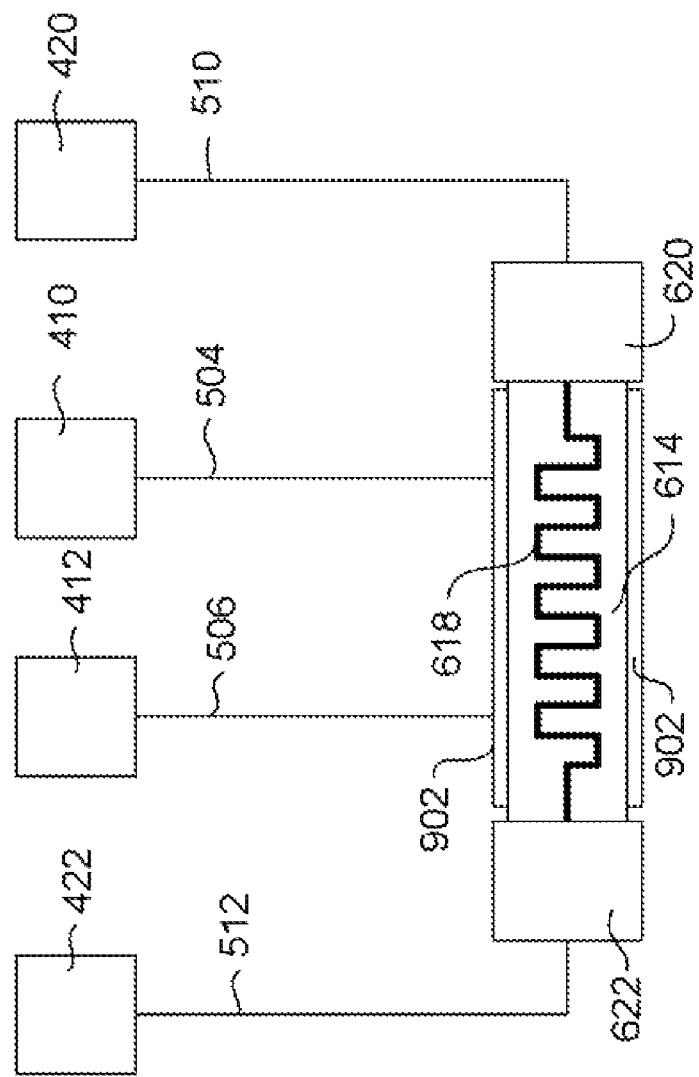

With reference now to FIG. 13, the anchor pads 620, 622 are deposited. The anchor pads can be constructed of Ta and Au like the resistor. The anchor pads 620, 622 extend into the holes 624, 626 in the membrane to form an electrical contact with the underlying outer contact pads 610, 612 (shown in FIGS. 10-12) as well as with the heating element 618. It would be possible to construct the heating element so that it extends into the holes 624, 626 to contact the pads 610, 612 in one step. However, because of the high topography of the membrane 614, the more conservative approach is to make contact with the pads 610, 612 using the anchor pads 620, 622 deposited in a separate deposition step. In addition, the anchor pads 620, 622 help to seal and anchor the ends of the membrane 614.

Figure 14:
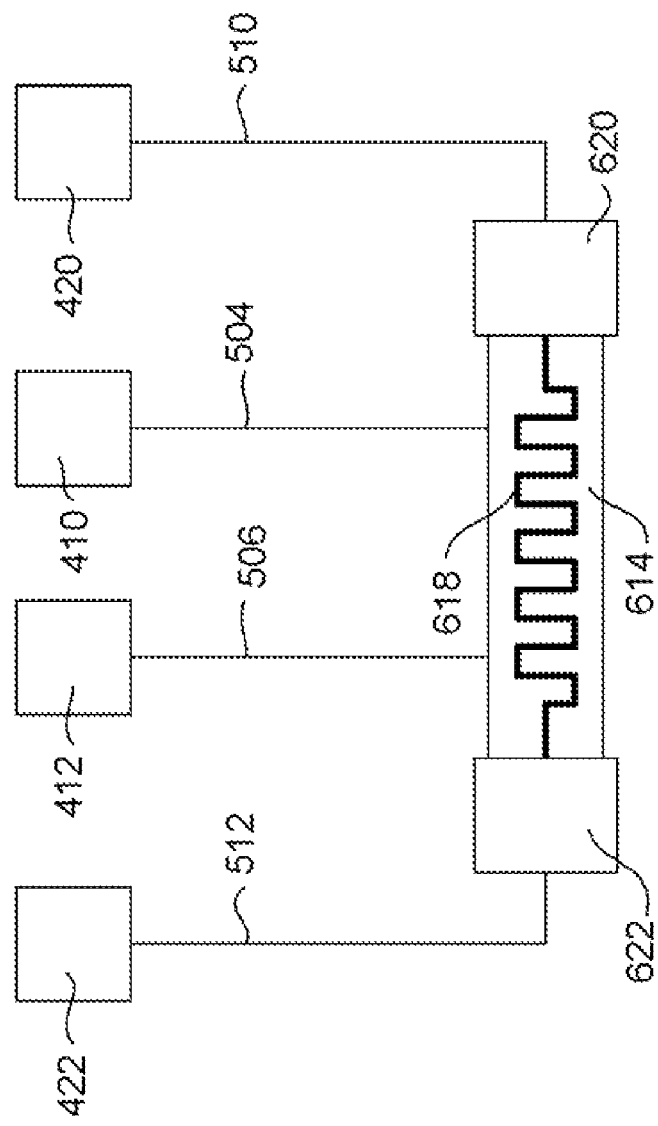

With reference to FIG. 14, the release layer 902 can be removed by etching. An etching solution can access the release layer at the exposed edges of the release layer 902. However, to further facilitate removal of the release layer under the membrane 614, the membrane 614 can be formed with slits or holes to further allow the etching solution to reach the release layer. Removal of the release layer results in a somewhat hollow space beneath the membrane as shown in FIG. 6. Therefore, the removal of the release layer allows the electrical connection between the inner contact pads to be broken when the contact bar 608 is raised during heating of the heating element 618 and membrane 614.

Figure 15:
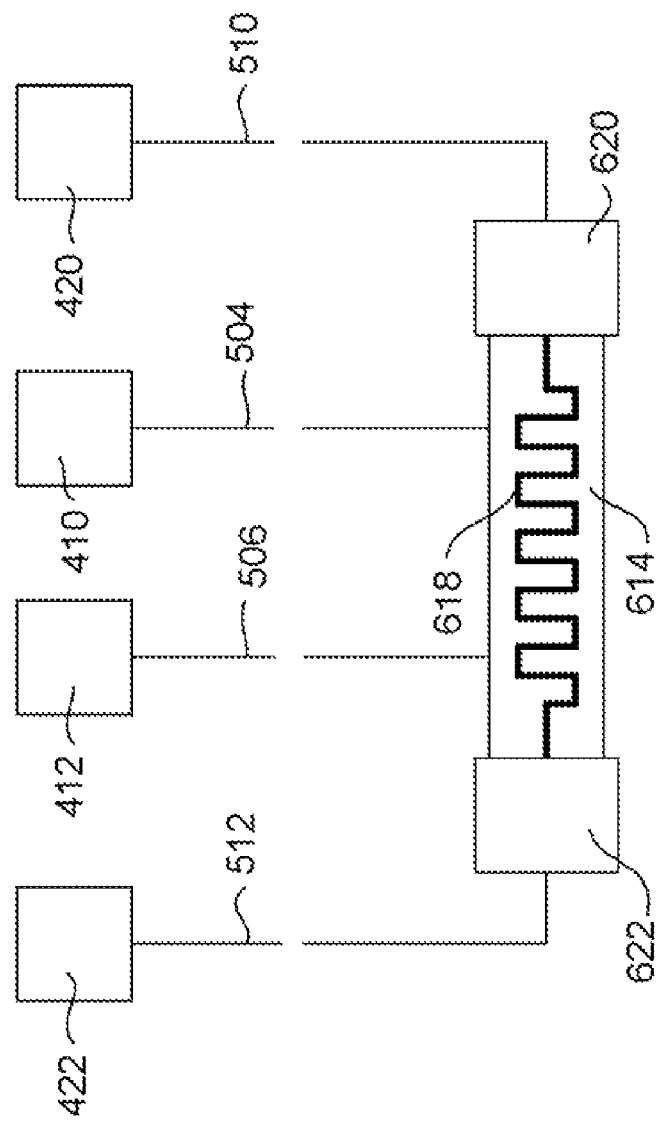

With reference to FIG. 15, when the ESD protection circuit is no longer needed, a processes such as laser deletion can be used to sever the leads 504, 506, 510, 512, permanently deactivating the ESD shunt circuit. This requires that some parts of the conductors 504, 506, 510, 512 be constructed of material which can be cleanly laser deleted, without generating debris. Such a method and structure are taught in U.S. Pat. Nos. 6,049,056 and 5,759,428, which are incorporated herein by reference.

Programmable Resistor Shunts

Electrolyte Based

An Electrostatic Discharge Shunt (ESD) structure according to another embodiment of the invention involves the use of programmable resistors that can be built on or into the substrate prior to the building of the recording head. These resistors have the characteristic that they can be switched from a rather conductive state (having a resistance on the order of an ohm) to a resistive state (having a resistance on the order of 10 Kohms). The switching of the resistive state is accomplished by applying a voltage across the resistors which has a polarity opposite to a previously applied voltage. The mechanism for this resistance change is the creation or destruction of conductive bridges across a layer of material which is intrinsically resistive. This is accomplished by passing current in the form of ions (usually Cu or Ag) through a solid electrolyte. Upon application of a positive voltage between the anode (the ion supplying electrode) and an inert counter electrode, positively charged, mobile ions are generated and are electrodeposited to form conductive metallic filaments which cross the electrolyte, connecting the two electrodes. The negative ions are not mobile. Upon application of a negative voltage, the metallic ions are reduced and the conductive filaments are removed. The magnitude of the applied voltage is a fraction of a volt, reflective of the oxidation/reduction potentials common to electrochemical reactions.

Devices having these properties have been proposed for memory devices, which may be made extremely small, have fast switching characteristics, have the ability to be cycled many times and have substantial differences in their on/off states. The requirements for use in the presently described embodiment of the invention, however, are somewhat different. The characteristics needed are (1) low resistance (about 1 ohm) in the conductive (on) state to provide sufficient protection from ESD events, (2) large resistance (about 10 kohms) in the resistive (off) state to limit electrical Interaction with the sensor being tested, especially for future sensors (such as tunnel valves) having a resistance of several hundred ohms. There is a relatively large area for constructing the resistors, so small size is not an issue as would be the case when using the programmable resistors as memory devices. In addition, there is no need for short switching times or more than a handful of switching cycles. One design criterion is that the resistor may not be switched under circumstances which will apply a voltage (even 0.1V) across the sensor. This requirement, needed to avoid stressing or ruining the sensor, can be addressed by a design that incorporates circuitry using two or three such programmable sensors, as will be discussed in greater detail below.

Figure 16:
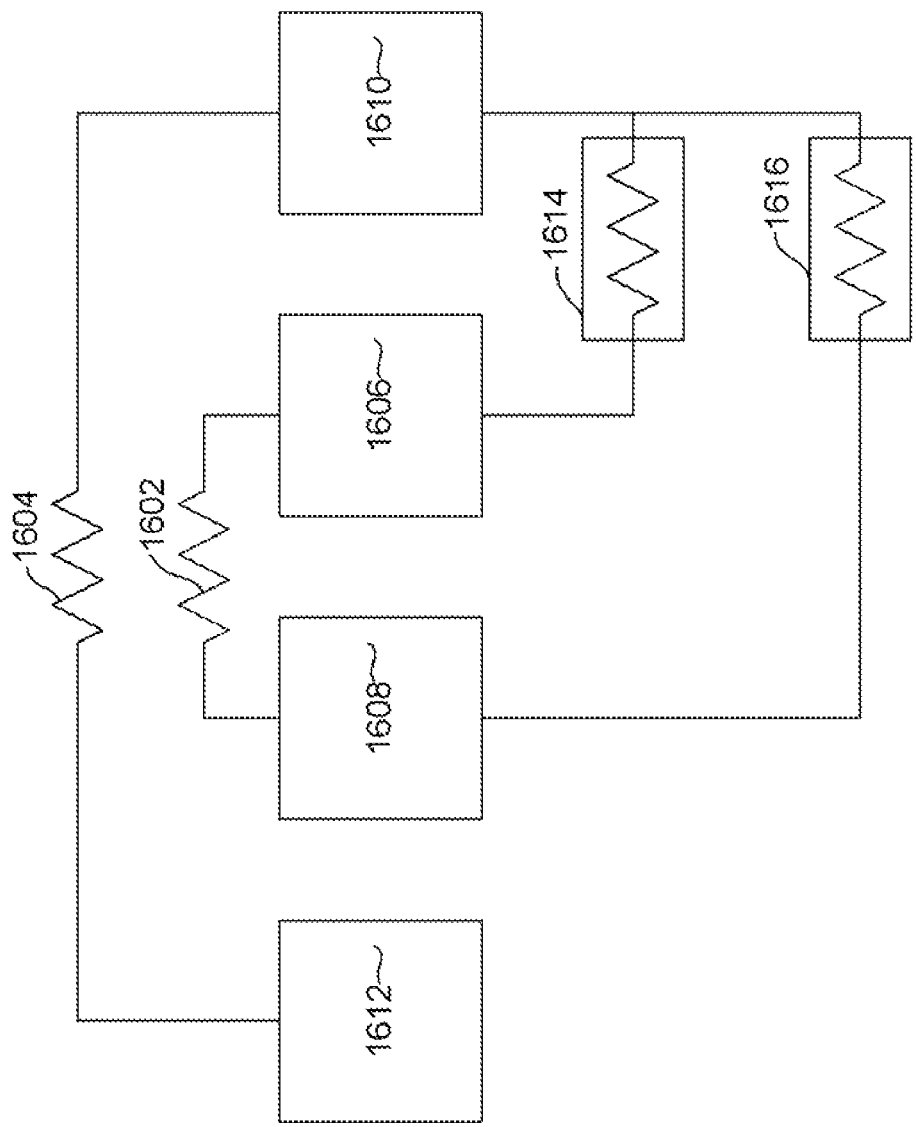
FIG. 16 is a schematic illustration of circuitry for providing an ESD shunt according to an embodiment of the invention.

FIG. 16 shows a schematic illustration of electrostatic discharge (ESD) protection circuitry according to a possible embodiment of the invention. As shown the circuitry can include a magnetoresistive sensor 1602, and a thermal fly height control heating element 1604. The sensor 1602 is electrically connected with connection pads 1606, 1608. The TFC heater element 1604 is electrically connected with connection pads 1610, 1612. The connection pads 1606, 1608, 1610, 1612 can be constructed of Au or some other electrically conductive material.

First and second programmable resistors 1614, 1616 are connected in parallel with one of the TFC connection pads 1610. The first programmable resistor 1614 is connected with a first end of the sensor 1602 (first sensor lead, not shown) and the second programmable resistor 1616 is connected with a second end of the sensor (second sensor lead, not shown). In order to switch the programmable resistor elements 1614, 1616, such as to perform testing on the sensor, the operator applies probes to the first and second sensor pads 1606, 1608 to short the sensor 1602. Then while the sensor is shorted, a voltage is applied between the first TFC contact pad and the shorted sensor. In this way, the resistor elements 1614, 1616 can be switched without applying a voltage across the sensor.

Figure 17:
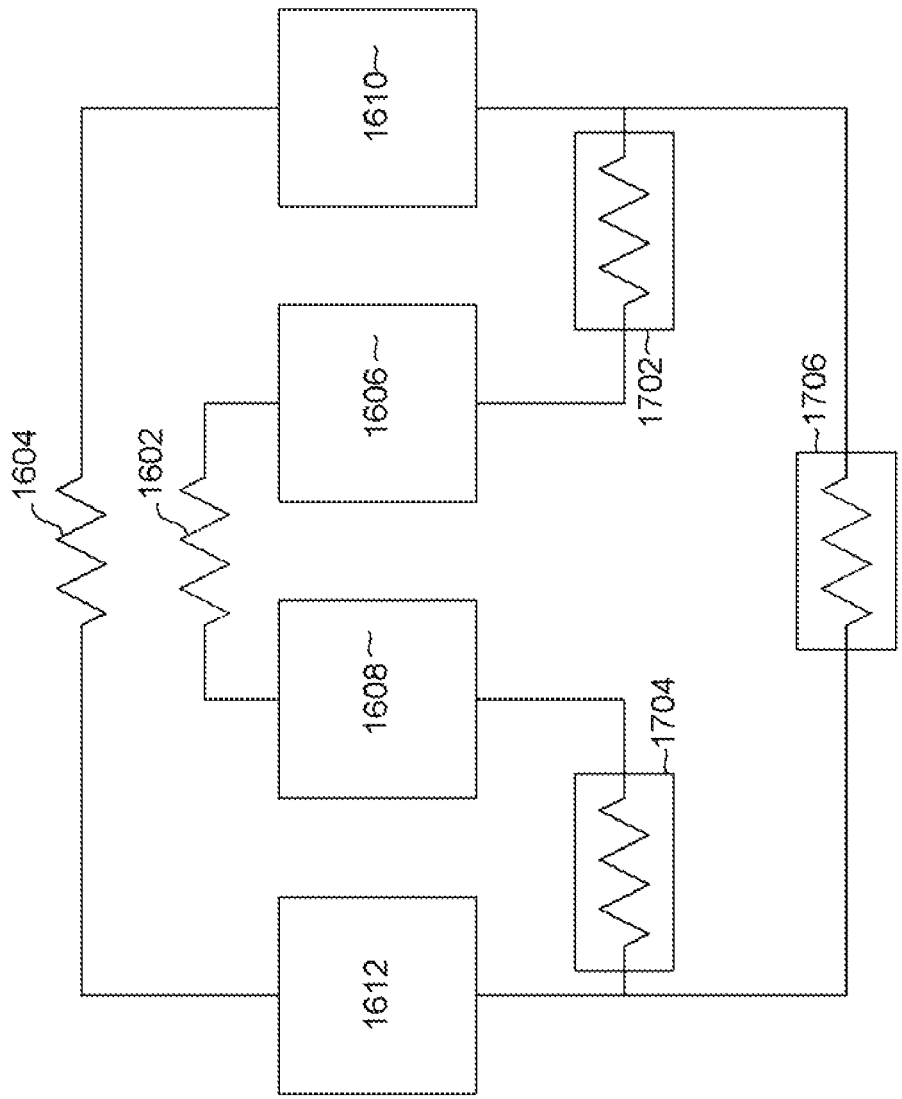
FIG. 17 is a schematic illustration of circuitry according to another embodiment of the invention for providing an ESD shunt.

With reference now to FIG. 17, a circuit design according to another embodiment of the invention can be used to provide ESD shunting. As with the previously described embodiment, the sensor 1602 can be connected with first and second sensor contact pads 1606, 1608, and the TFC heating element 1604 can be connected with first and second TFC contact pads 1610, 1612. This embodiment employs three programmable resistor elements 1702, 1704, 1706. Two of the programmable sensor elements (eg. first and second resistors 1702, 1704) are connected between one sensor lead and one TFC pad, with the third resistor 1706 connected in parallel with the TFC. These resistors are switched in a two-stage process in winch two resistors are switched in the first stage, with the third resistor switched in the second stage. In the first stage pads 1610 and 1612 are given polarity one, with the shorted sensor pads, 1608 and 1606 being given polarity two. In the second stage pad 1612 is given polarity one with the remaining pads shorted at polarity two. The resistors are changed to the reversed state by reversing the process.

Many materials systems have been found to demonstrate the change in resistance arising from oxidation/reduction of mobile metallic ions. The systems normally comprise an inert, stable electrode, an electrolyte layer and an anode electrode. The electrolyte material may contain a notable concentration of the material from which the anode is made (usually Cu or Ag). For many embodiments of these material can be found in U.S. Pat. Nos. 6,865,117 and 6,825,489 which are incorporated herein by reference. Electrolytes of published merit include Ge-chalcogenide glasses, such as GeSe, and oxides, such as $WO_3$.

The structure which comprises the programmable resistor element is preferably constructed on the insulator-coated substrate normally used to build the recording head. This substrate is normally sputtered alumina on $Al_2O_3$/TiC ceramic. A lower electrode structure (eg., W, 30 nm thick, with another thicker metallic layer beneath) is sputtered onto the insulator, then patterned such that the lower electrode is separated into one or more segments surrounded by an insulator (e.g., alumina). The electrolyte (e.g. WO3, 50-100 nm thick) is deposited, which contains the conducting ions of interest (e.g., Cu). The anode electrode (e.g., Cu 25 nm thick) is deposited and patterned. This structure may then be annealed to distribute the Cu in the electrolyte. The anode may be covered by a thicker metallic cover layer. These layers are then covered by an insulator, except where vias are formed to allow connection of the resistors to the sensor and the TFC studs. A portion of the connection is built on the final surface of the wafer to allow laser deletion of the programmable resistor elements from the circuitry once testing is complete. Based on estimates of the resistance change reported from small structures (eg. 5 um diameter from a W—$WO_3$—Cu device), it is estimated that the resistance values which can be achieved using most of the area of a slider (700×230 um) is about 1 ohm for the on state and greater than 10 kOhm in the off state.

Figure 18:
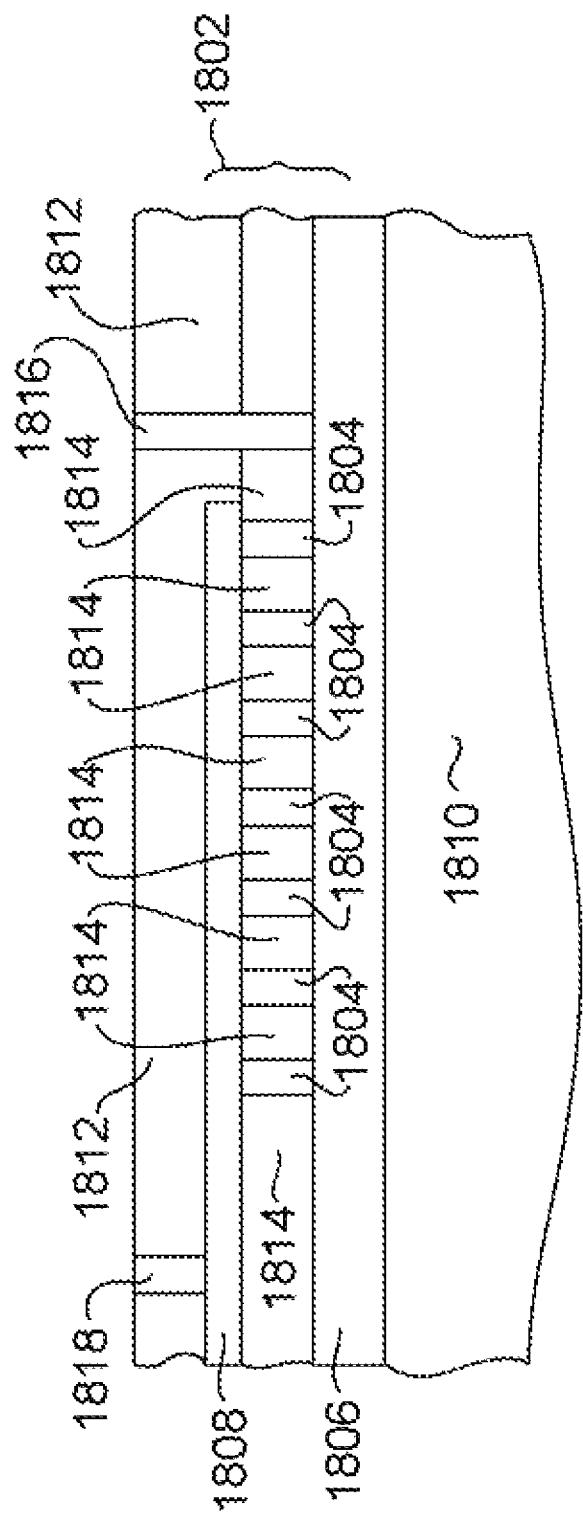
FIG. 18 is a cross sectional view of a programmable resistor element according to an embodiment of the invention.

FIG. 18 shows a cross sectional view of a possible embodiment of a programmable resistor element 1802. The resistor element corresponds to the programmable resistor elements 1614, 1616 discussed with reference to FIG. 16 or to the programmable resistor elements 1702, 1704, 1706 discussed with reference to FIG. 17. It can be seen in FIG. 18 that a programmable resistor element 1802 can actually consist of a plurality of smaller resistor elements 1804 sandwiched in parallel between first and second lead layers 1806, 1808. Programmable resistor element 1802 can be formed on a substrate 1810 such as the sputtered aluminum oxide or aluminum oxide/titanium carbide substrate water used to make sliders. An insulation layer 1812 such as alumina can be formed over the resistor element 1802, and can be provided with vias 1816, 1818 to allow electrical connection with the leads 1806, 1808. The individual resistors 1804 within the resistor element 1802 can be separated from one another by insulation fill layers 1814 such as alumina.

Figure 19:
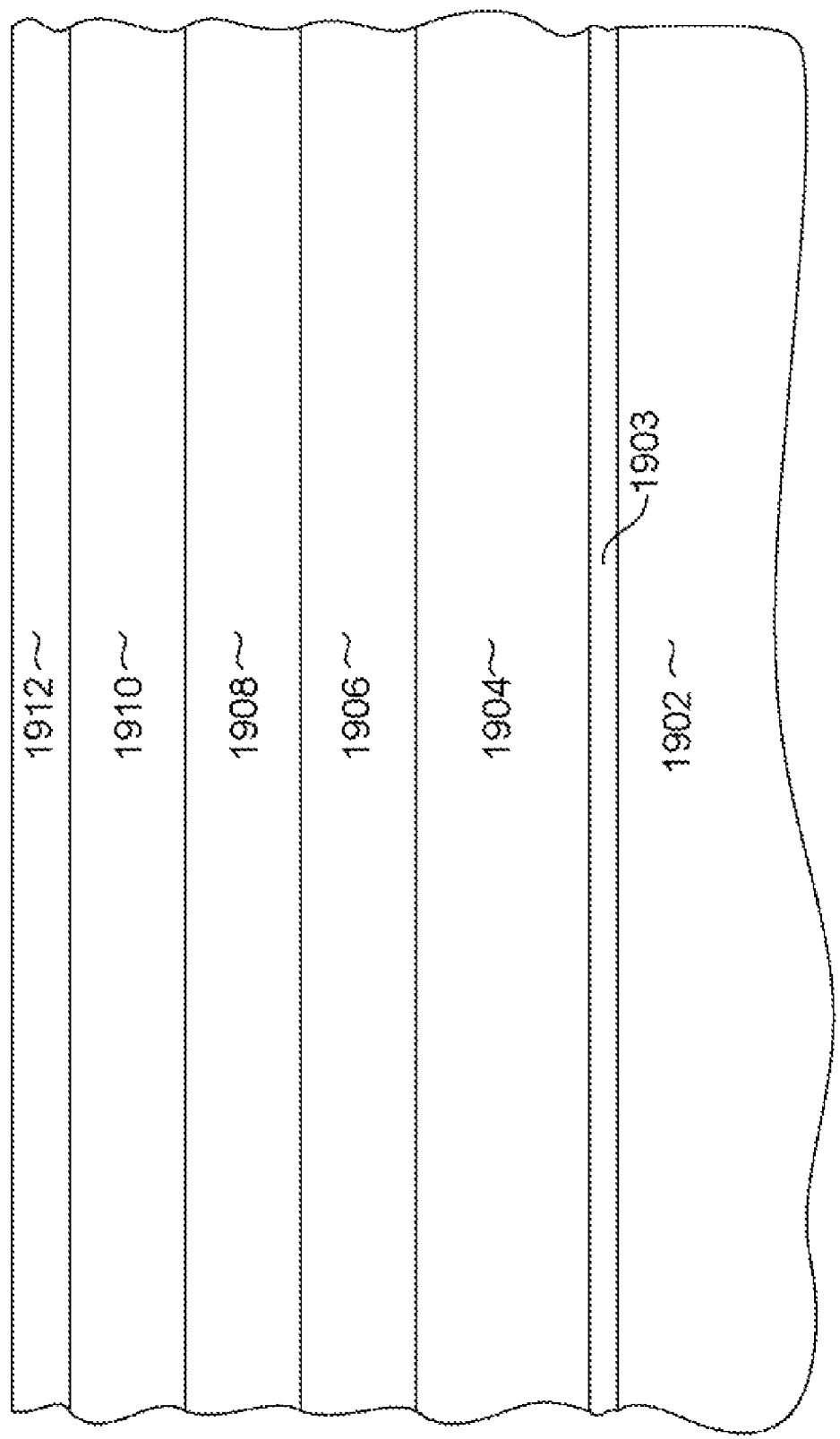
FIGS. 19-25 illustrate a programmable resistor in various intermediate stages of manufacture in order to illustrate a method of manufacturing a programmable resistor according to an embodiment of the invention.

With reference now to FIGS. 19-25 a method for manufacturing a programmable resistor element 1802 (which could also be considered a resistor array) according to an embodiment of the invention is described. With particular reference to FIG. 19, a substrate 1902 is provided, and an insulation layer 1903 is provided over the substrate 1902. The substrate can be the body of a slider which could be constructed of sputtered aluminum oxide or aluminum oxide/titanium carbide. A first or bottom electrically conductive lead 1904 is deposited over the substrate 1902. The first lead can be constructed of various electrically conductive materials, such as for example, Ni, Cu, Au, etc.

A first electrode material 1906 is then deposited over the first lead 1904. The first electrode is an inert electrode material, such as W, which can be about 30 nm thick, although this material and thickness are only by way of example. A metallic layer may be included beneath the W as part of the electrode 1906. Then, a solid state electrolyte layer 1908 is deposited over the first electrode layer 1906. The solid state electrolyte can be, for example $WO_3$ and can be 50-100 nm thick. A second electrode such as Cu 1910 can be deposited over the electrolyte layer 1908. Although the electrolyte layer 1908 may or may not have the desired ions (eg. Cu), an anneal can be performed to drive some second electrode (eg Cu ions from the Cu electrode) into the electrolyte layer 1908. A capping layer 1912 such as Au+Ta can then be deposited.

Figure 20:
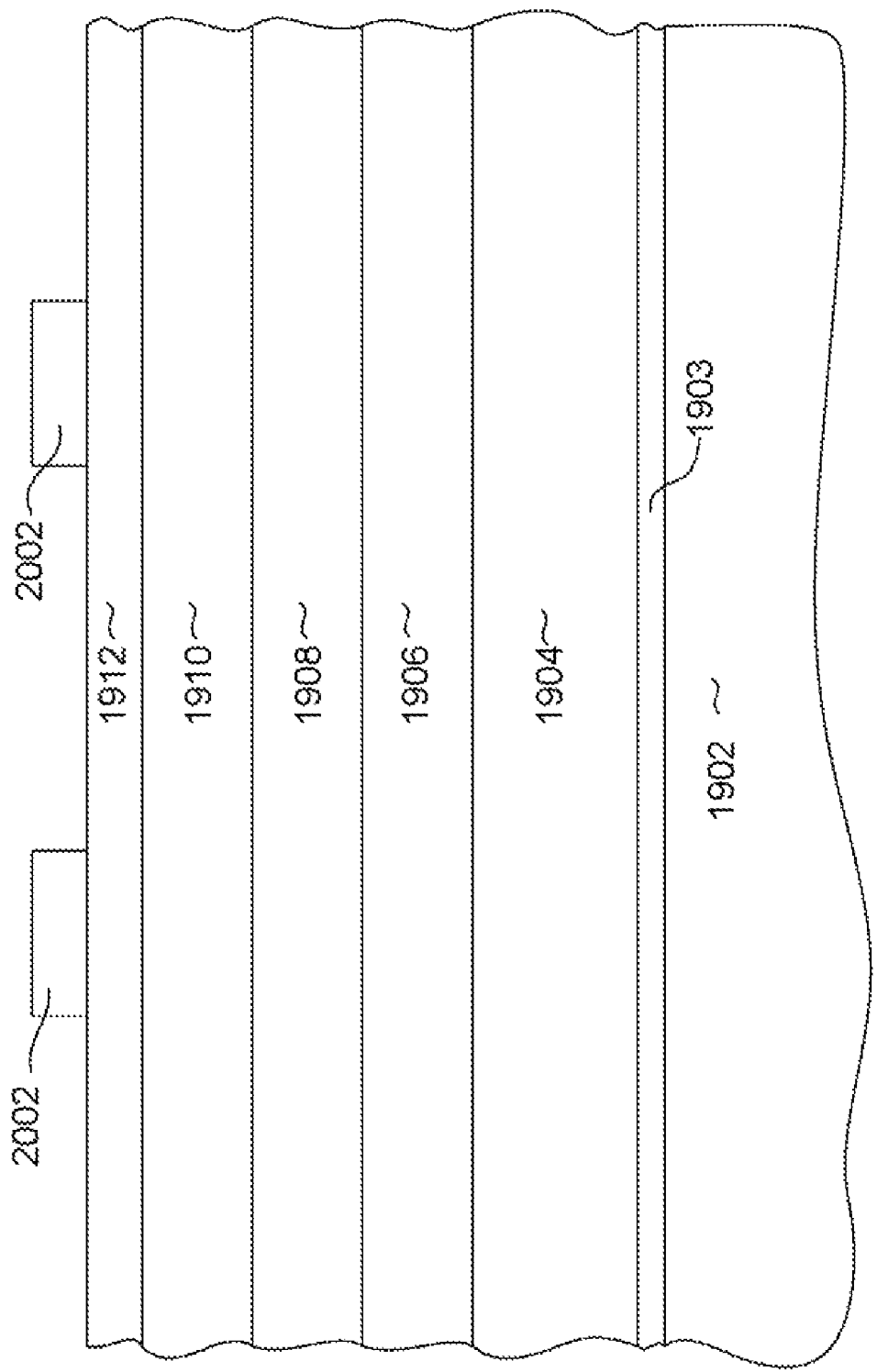
Figure 21:
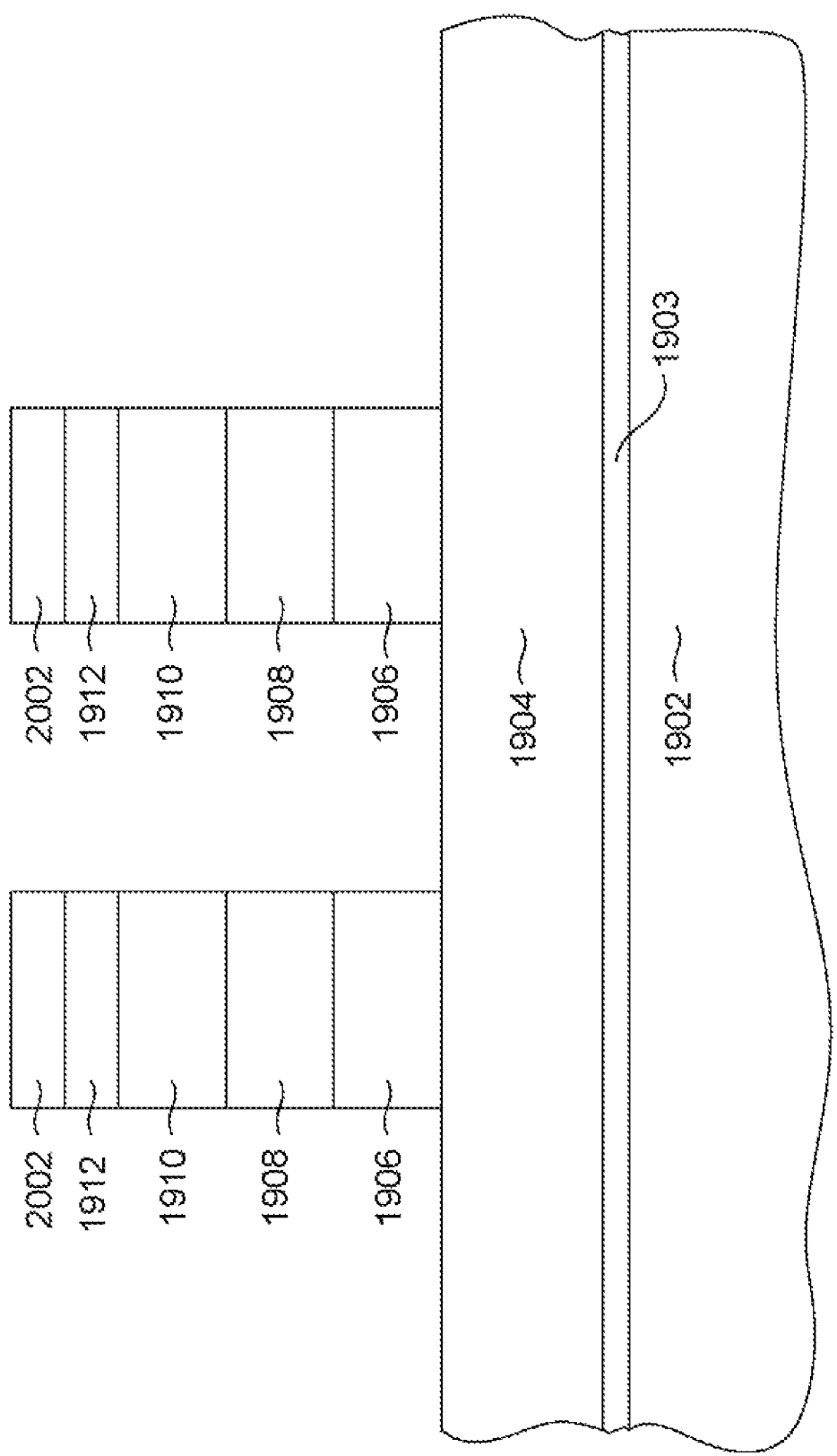

With reference now to FIG. 20, a plurality of mask islands 2002 are formed on the deposited layers. The islands 2002 can have a diameter of, for example, 1-20 um. Although two such mask islands 2002 are shown, it should be understood that many more islands could be used. These mask islands can include a photoresist layer, and may also include one or more image transfer layers (such as DURAMIDE®) and/or one or more hard mask layers. Then, with reference to FIG. 21, a material removal process such as ion milling is performed to remove portions of the layers 1906, 1908, 1910, 1912 that are not protected by the mask islands 2002. An endpoint detection scheme can be used to determine when the first lead 1904 has been reached and when the ion milling or other material removal process should be terminated.

Figure 22:
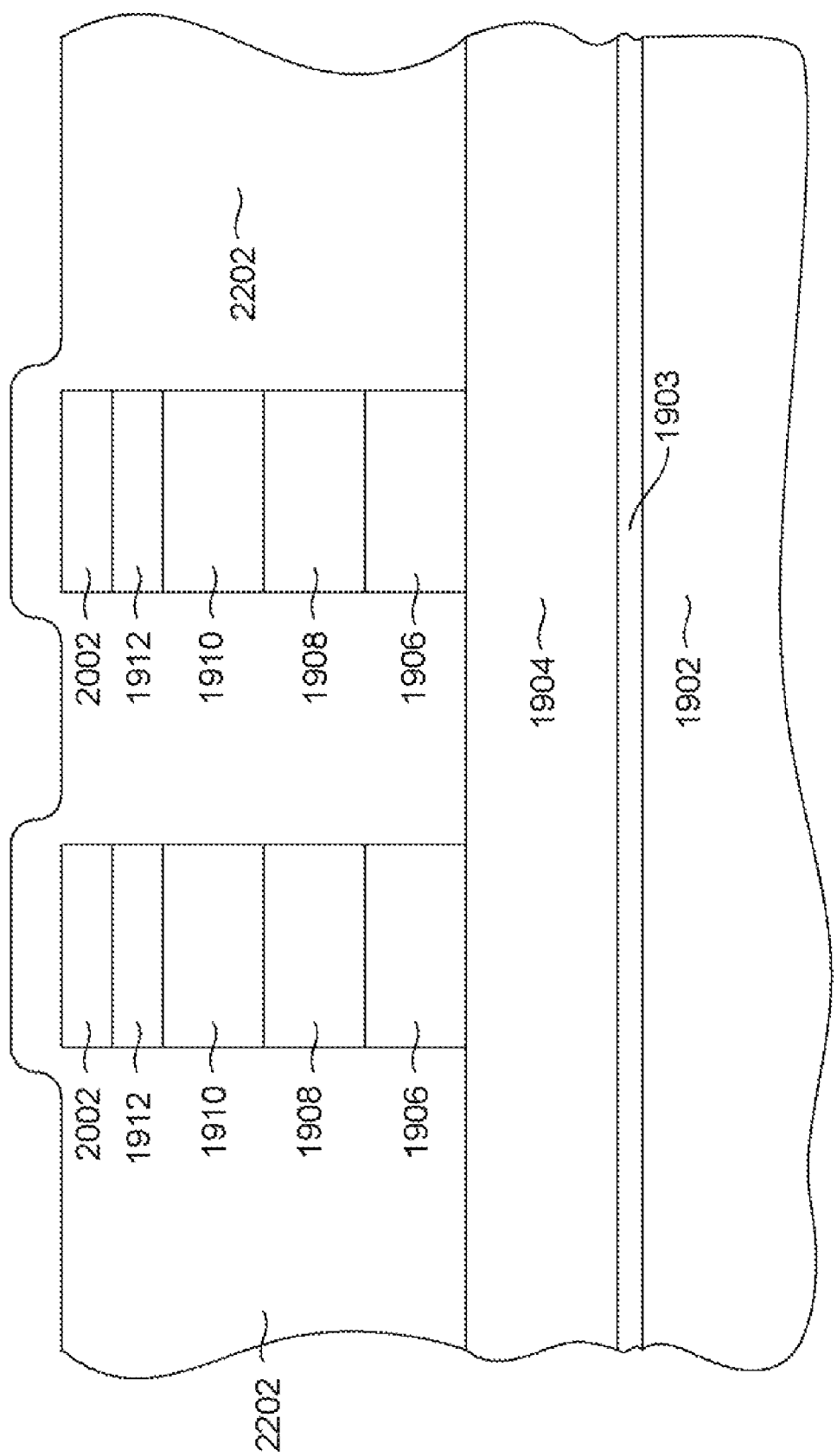
Figure 23:
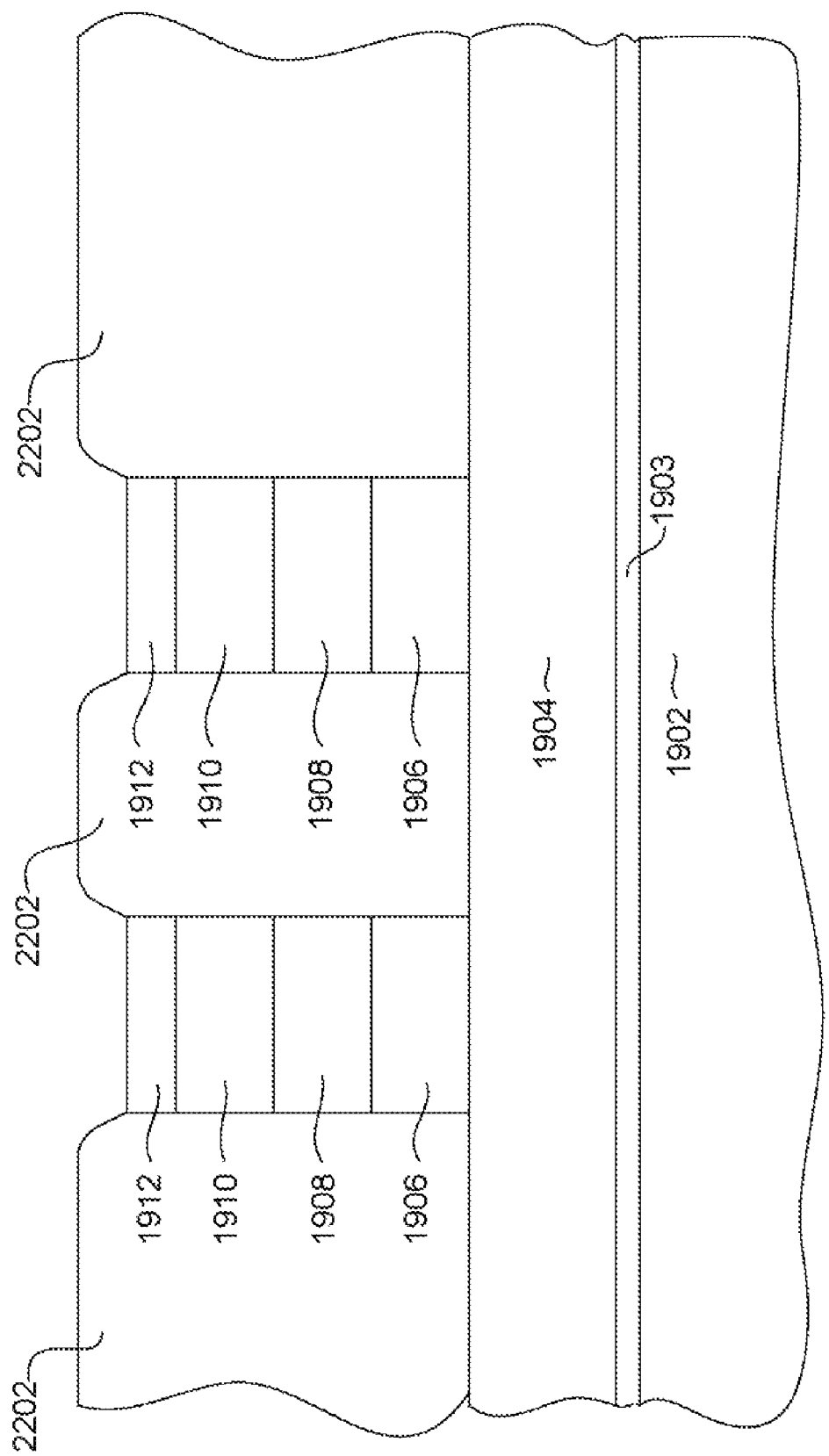
Figure 24:
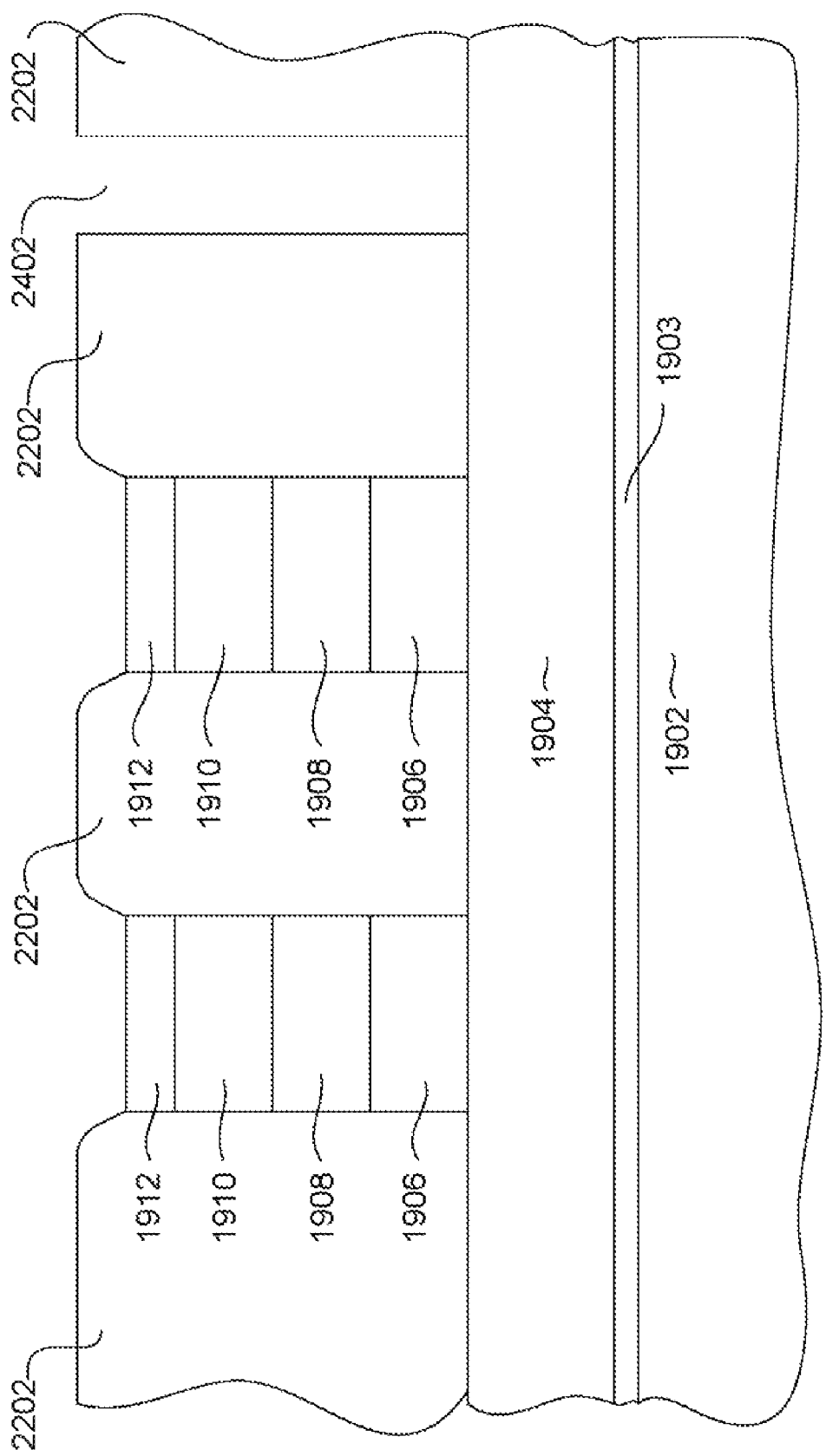
Figure 25:
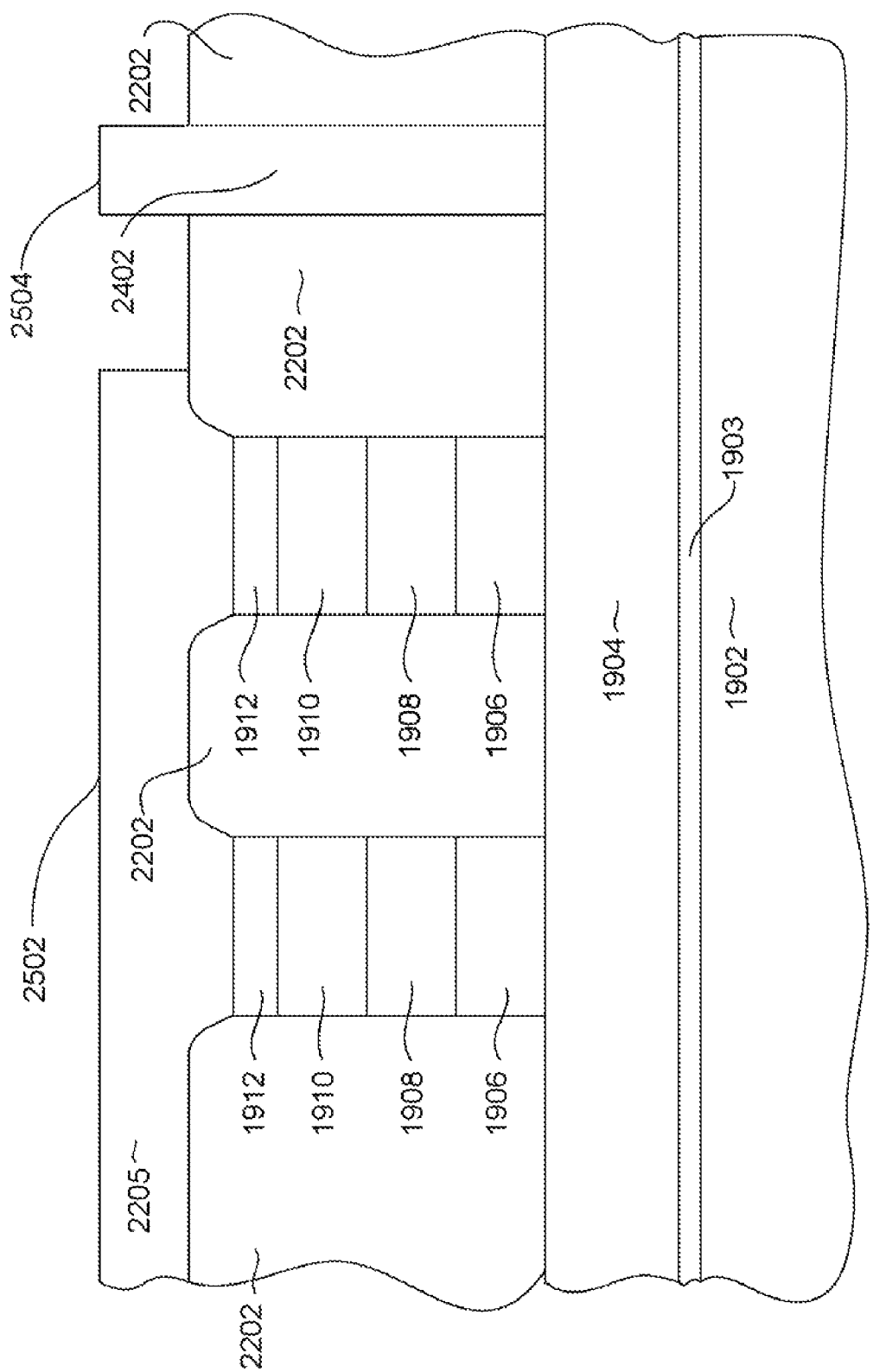

With reference now to FIG. 22 a layer of insulation such as alumina 2202 is deposited full film, preferably with the mask islands 2002 left in place. Then, with reference to FIG. 23, a liftoff process is used to remove the mask islands 2002. The liftoff can be a chemical liftoff process or a chemical mechanical polish (CMP) or a combination of these. Then, with reference to FIG. 24, a via 2402 can be formed in the insulation layer to provide access to the underlying lead. With reference to FIG. 25, an electrically conductive material such as Cu or Au can be formed over the tops of the layers 1906, 1912 to form a second or upper lead 2502. An electrically conductive material 2504 can be deposited into the via 2402 to provide electrical contact with the first or lower lead. The upper lead 2502 and electrically conductive material 2504 can be deposited using common masking and deposition steps.

The above described process produces programmable resistors that can be switched between high resistance states and low resistance states by applying a voltage to the top and bottom leads 1904, 2502. This puts the resistor in a low resistance state. Applying a voltage in one direction causes ion bridges to form across the electrolyte layer 1908 between the electrode layers 1906, 1910. Reversing this voltage causes these ion bridges to break down, reverting the resistor to its high resistance state. It should be pointed out that variations on the above described structure can be made. For example the order of the electrode layers 1906, 1910 can be reversed such that layer 1906 is above the electrolyte layer 1908 and layer 1910 is below the electrode layer 1908. And, more importantly, material systems based on Ag—Ge—Se or Ag—Ge—S may be constructed in analogous mode to the exemplary Cu—$WO_3$ system described above.

ESD Shunting Using Phase Change Resistors

Another type of resistor that can be used in an Electrostatic Discharge (ESD) protection circuit is a resistor constructed using a phase change material. A phase change material is a material that changes from an electrically conductive state to an electrically insulating state based on its crystalline structure. Resistors based on this principle can switch from a conductive state having a resistance of about 1 Ohm to a high resistance state having a resistance of about 1 kOhm. The resistors, described here as Phase Change Resistors (PCRs), are based on the change in resistance of one of many chalcogenide materials (such as $Ge_2Sb_2Te_5$ [GST], InSbTe, AgInSbTe, etc.) as they are transformed between amorphous and crystalline states. The transformation from the amorphous high resistivity state (about 0.1 Ohm-cm) to the crystalline state occurs upon annealing at a temperature below the melting point, and results in a lower resistivity (as low as $10^{-4}$ Ohm-cm).

This characteristic has been proposed for use in non-volatile memory technology, such as in read/writable Compact Disks (CDs) and Digital Video Disks (DVDs), where the phase change is laser-heating induced, and the accompanying property change is the material's reflectivity. The structures being developed for memory devices, based on phase change materials are quite small, have fast switching characteristics and have the ability to be cycled through virtually an unlimited number of cycles.

The requirements for the present invention, in using phase change resistors for ESD protection in a magnetic write head, are quite different. The resistors will be switched only a few times for sensor measurements. They may be relatively large (the total area available for resistors is over 0.15 mm² for current sliders) and may be switched slowly (about 1 second). Furthermore, the resistance value is lower for the ESD protection application, as compared with memory devices. For the next several generations of magnetic recording sensor, characteristic resistances will range from around 10 to around 500 Ohms. The ESD protection resistors should have better than 10 times reduction in resistance with respect to the sensor, thereby requiring the low-resistance value of the PCRs to be in the range of about 1 to 50 Ohms. To reduce the influence of the parallel resistances of the PCRs on the measurements made on the sensor, the high-resistance state should have a resistance higher than 10 times that of the sensor. This requires that the high-resistance values be in the range of 100 to 5000 Ohms.

There are at least two techniques available for switching the PCRs from one state to another. In one technique the switching is accomplished using a focused laser witch heats a single PCR with a short set of pulses designed to "reset" the PCR into its crystalline state. The second approach is one in which electrical heating current is passed through the two PCRs. These approaches will be discussed separately in greater detail herein below.

PCRs Switched Using Electrical Current:

As mentioned above, one of the requirements of a programmable ESD circuit is that it not apply a voltage across the sensor. To avoid stressing the sensor, an ESD shunt circuit as described earlier with reference to FIG. 16, except that in this case, the programmable resistor elements 1614, 1616 are PCR resistor elements. Before performing tests on the sensor it will be desired to switch the PCRs 1614, 1616 to their high resistance (off or reset) state. This can be accomplished by connecting the resistors 1614, 1616 between the two ends of the sensor, as shown, and with another connection stud or pad, which in the preferred embodiment is a TFC stud but could be some other stud.

The procedure for switching both resistors is to use the probes (not shown) to short the sensor studs 1606, 1608, then to use the probes to apply a potential between the shorted sensor studs and the TFC stud 1610. Preceding an individual test of the sensor the "reset" current is applied. This is a short, high-current pulse used to convert the PCRs to the high resistance state. After an individual test is finished, a longer, lower current set pulse is applied. This converts the PCR material to its crystalline state, allowing low resistance protection against ESD events. Once the resistor testing is fully completed, the PCRs may be removed from the circuit by laser deleting the interconnections lines on the surface of the slider, or as an alternative.

Because, in this embodiment, PCRs can be electrically actuated, they can be constructed at the first stage of wafer build, located beneath the sensor and writer and encased in an insulator such as alumina. This avoids any competition for slider surface area between the rather large resistors and the structures of the read and write element. Furthermore, the materials of the phase change resistors are removed from chemical interaction with the head structures and with the interior of the disk drive. Several general geometries are available to allow the construction of the resistors, Two examples are described below.

Figure 26:
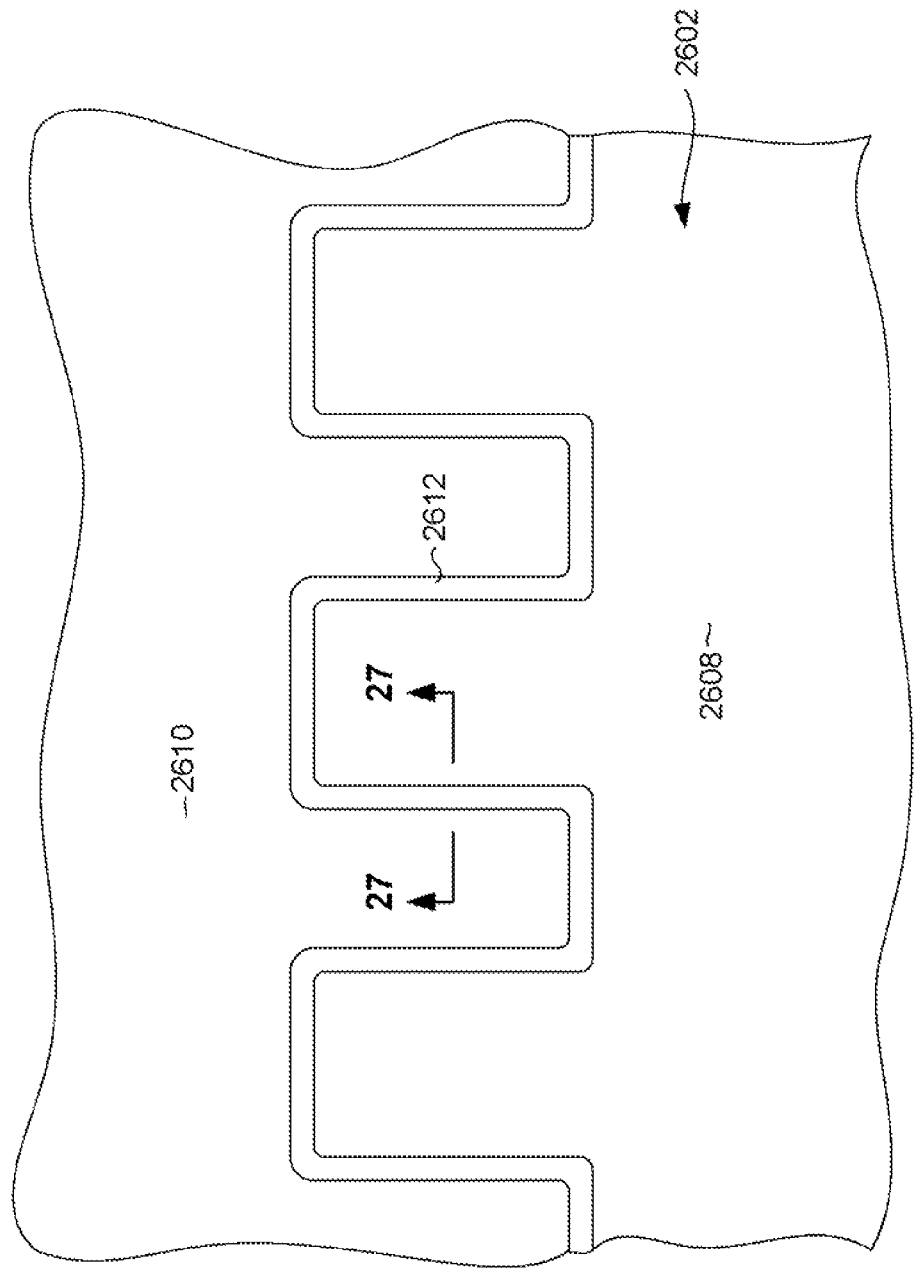
FIG. 26 is a top down view of a phase change resistor according to an embodiment of the invention.
Figure 27:
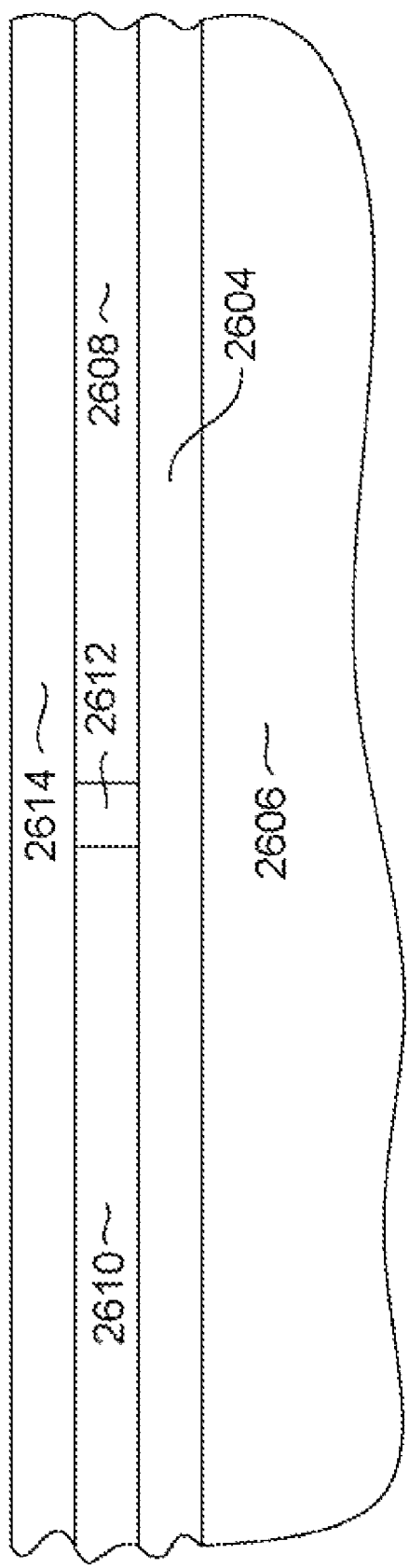
FIG. 27 is a view taken from line 27-27 of FIG. 26.

FIG. 26 shows a top down view looking down on a PCR constructed on a wafer. FIG. 27 shows a cross section, taken from line 27-27. A. PCR 2602 can be constructed by first applying an insulating layer 2604, such as alumina, onto a substrate 2606, which can be the wafer itself. A pair of electrodes, or leads 2608, 2610 are deposited on the insulation layer 2604 so as to leave a space or trench between them. This trench, which can have a serpentine shape as shown or which could have some other shape, is filled with a phase change material 2612 such as as $Ge_2Sb_2Te_5$ [GST], InSbTe, AgInSbTe, etc. A protective insulation layer 2614 such as alumina can be provided above the electrodes 2608, 2610 and phase change material 2612. After PCR has been constructed, the read and write heads can be built above the PCR 2602. Vias (not shown in FIGS. 26 and 27) can be provided to electrically connect the electrodes 260S, 2610 with circuitry at the surface of the slider, as described previously with reference to FIG. 16.

Figure 28:
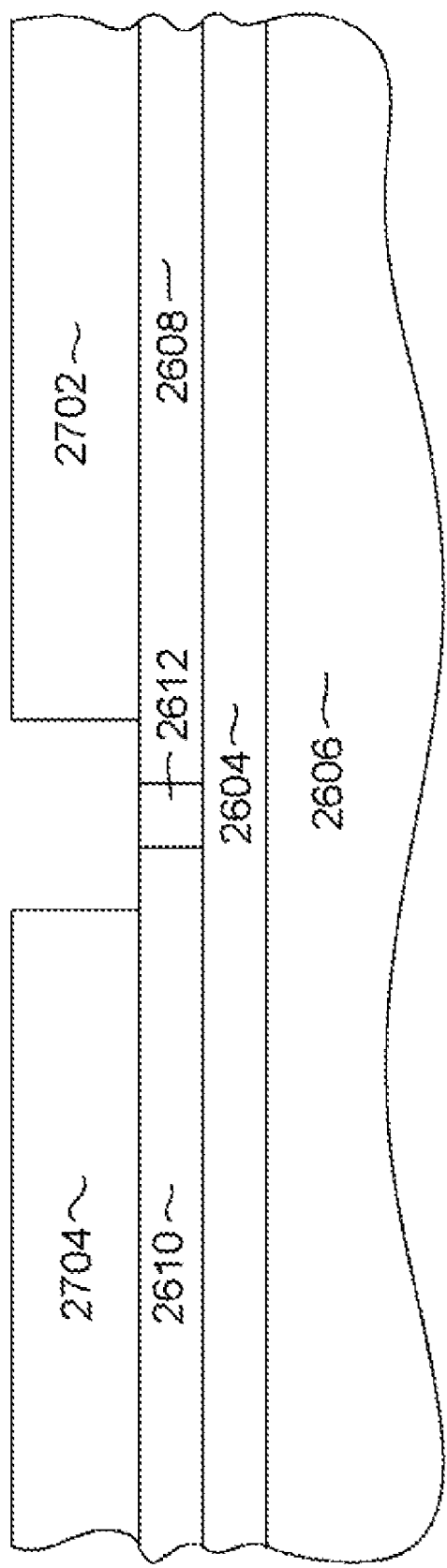
FIG. 28 is a cross sectional view of a phase change resistor according to an alternate embodiment of the invention.

As mentioned above, to put the PCR in its amorphous state, the PCR must be heated and then rapidly cooled (quenched). This requires that heat must be rapidly conducted away from the phase change material 2612. With reference to FIG. 28, an embodiment that can further facilitate this heat removal includes heat sink structures 2702, 2704. These heat sink structures are constructed of a material that has a high thermal conductivity, which may or may not be electrically conductive. For example, the heat sink structures 2702, 2704 could be constructed of Cu and could be of the same material as the electrodes 2608, 2610. The heat sink structures 2702, 2704 are preferably constructed in a separate deposition stage than the electrodes 2608, 2610, even if they are constructed of the same material as the electrodes 2608, 2610. This allows the electrodes to be constructed sufficiently thin to allow the dimensions of the gap between them (and accordingly, the PCM 2612) to be well defined. The heat sink structure 2702, 2704 can then be formed with higher topography and less critical dimensions.

Figure 29:
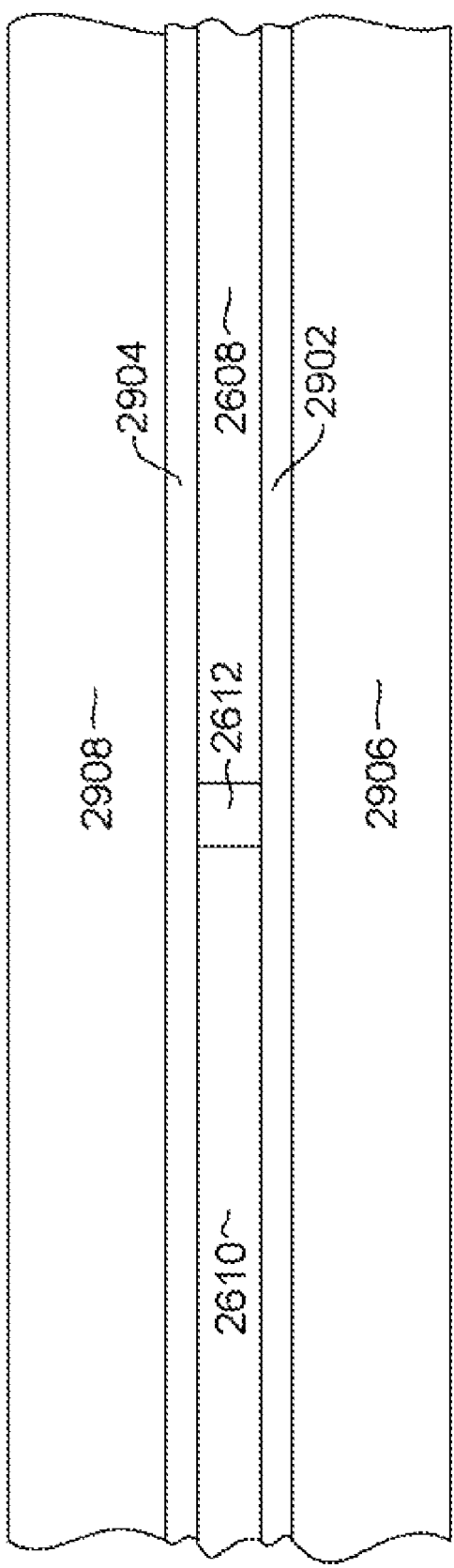
FIG. 29 is a cross sectional view of a phase change resistor according to yet another embodiment of the invention.

With reference now to FIG. 29, another embodiment for facilitating heat removal includes first and second thin insulation layers 2902, 2904 such as alumina formed above and below the PCM 2602. The PCM 2602, and insulation layers are sandwiched between thicker high thermal conductivity heat sink layers 2906, 2908, which can be constructed of, for example, Cu. Alternatively, if the heat sink layers 2906, 2908 are constructed of an electrically insulating material, high thermal conductivity material, the insulation layers 2902, 2904 could be eliminated.

Figure 30:
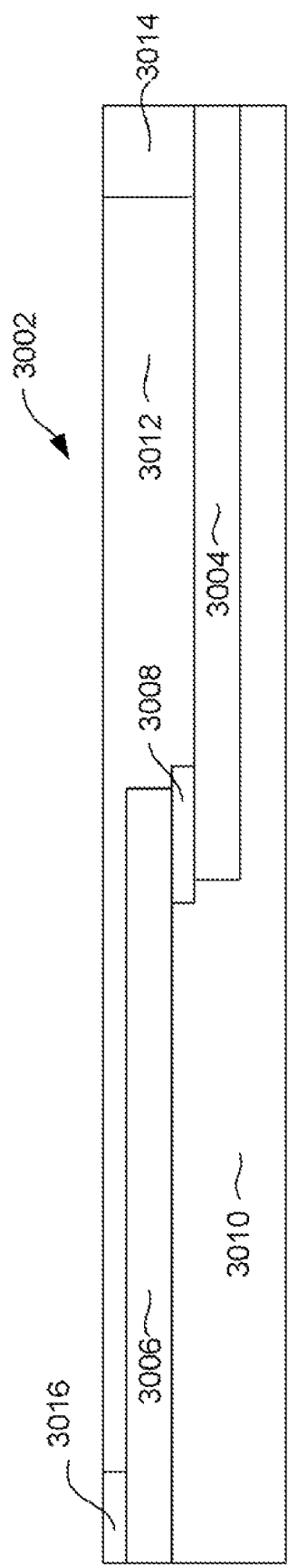
FIG. 30 is a cross sectional view of a phase change resistor according to still another embodiment of the invention.

With reference to FIG. 30, another possible embodiment of a PCM resistor 3002, shown in cross section, includes first and second electrodes 3004, 3006 disposed above and below a phase change material 3008, such that current flows through the phase change material in a direction perpendicular to the surface of the wafer. The electrodes 3004, 3006 and phase change material 3008 can be encased in insulation layers 3010, 3012. Electrically conductive studs 3014, 3016 can extend upward through vias formed in the insulation layer 3012.

Figure 31:
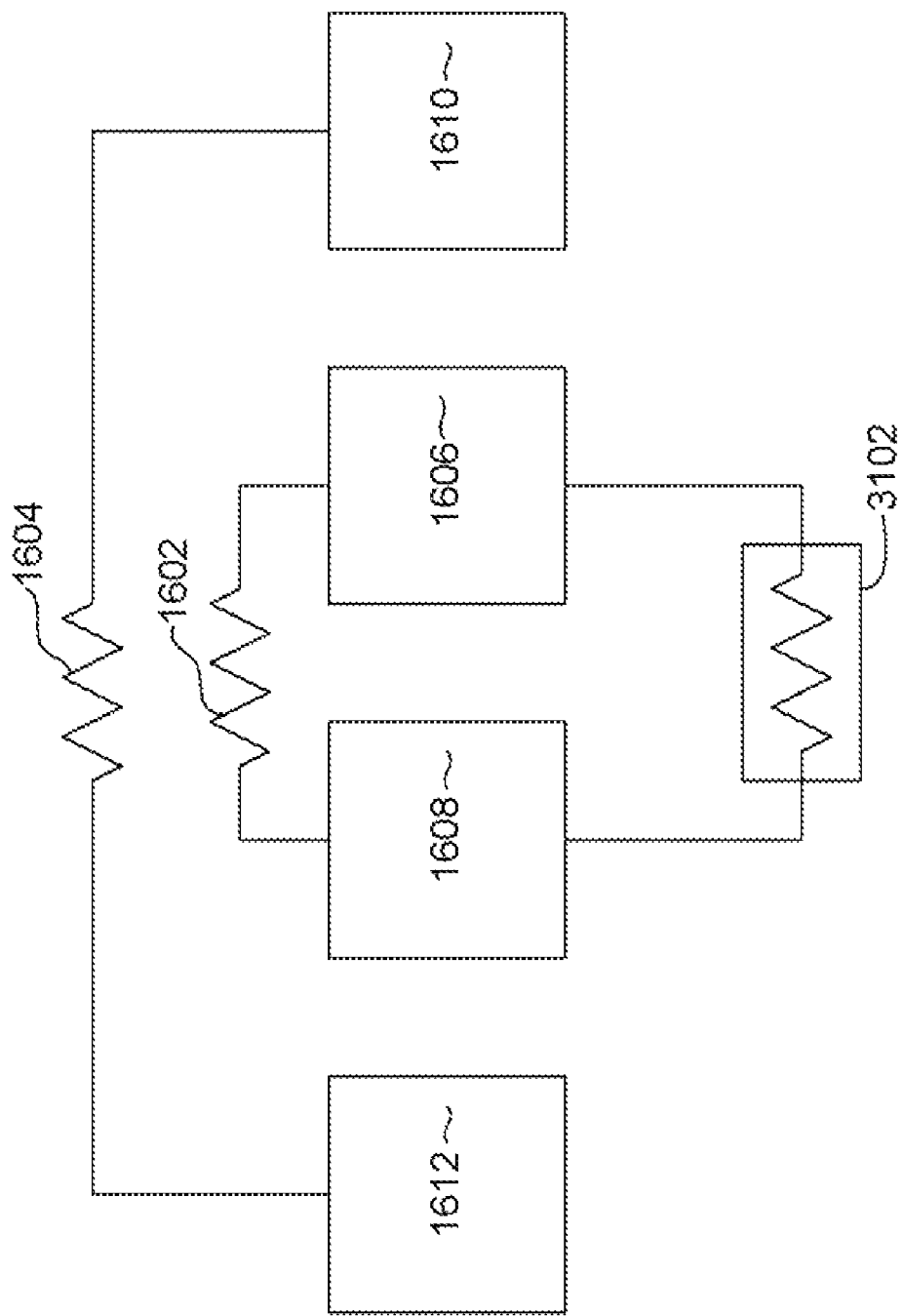
FIG. 31 is a schematic view illustrating circuitry for providing ESD shunting.

PCRs Switched by Laser Pulse:

Another way in which a PCR can be switched is by applying a laser pulse to the PCR. This of course means that the PCR must be located at the surface of the slider where a laser pulse can be used to heat the PCR. Because the PCR is heated by laser rather than electrically, a simpler ESD circuit can be employed. With reference to FIG. 31, such a circuit includes a sensor 1602 connected with sensor contact pads or studs 1606, 1608. A PCR programmable resistor element 3102 can be electrically connected with either side (either lead) of the sensor 1602 by connection with the pads 1606, 1608. In other words, the PCR programmable resistor element 3102 can be connected directly in series with the sensor 1602.

Figure 32:
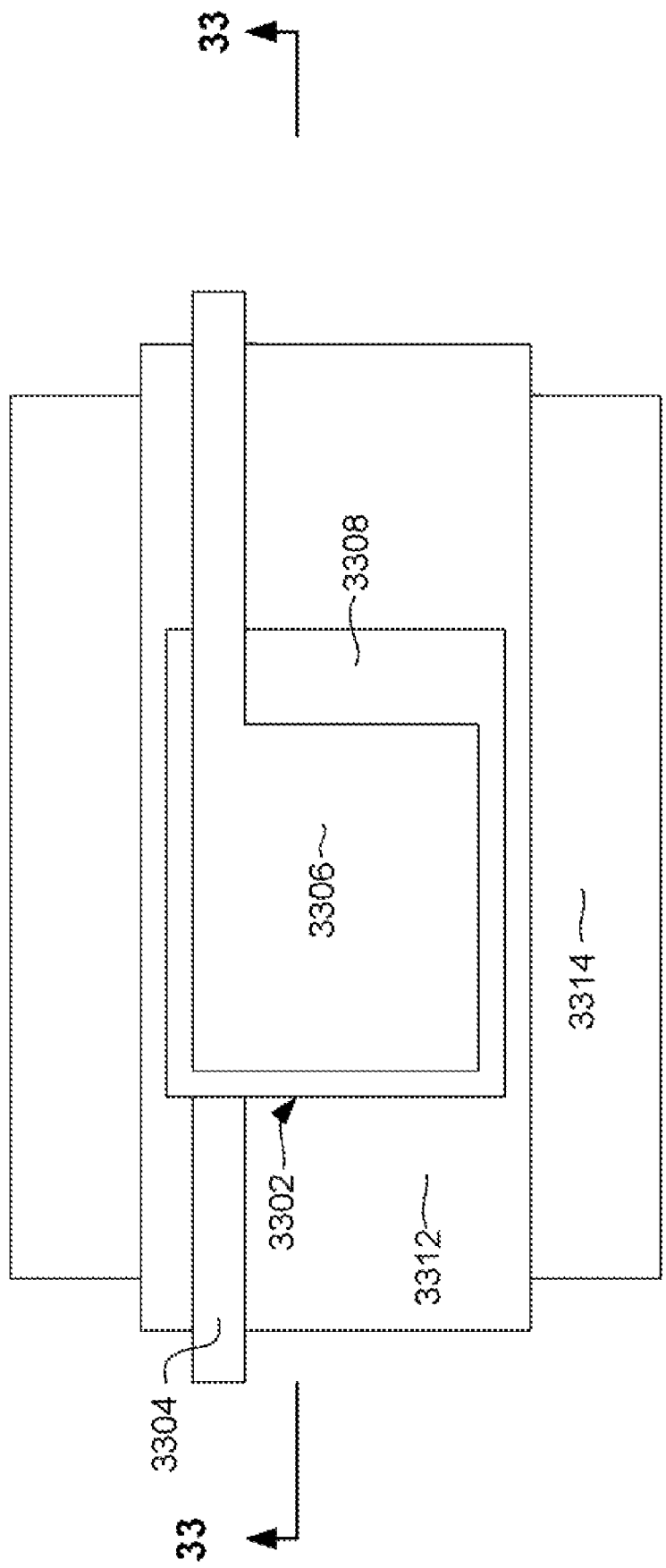
FIG. 32 is a top down view of yet another embodiment of a phase change resistor according to an embodiment of the invention.
Figure 33:
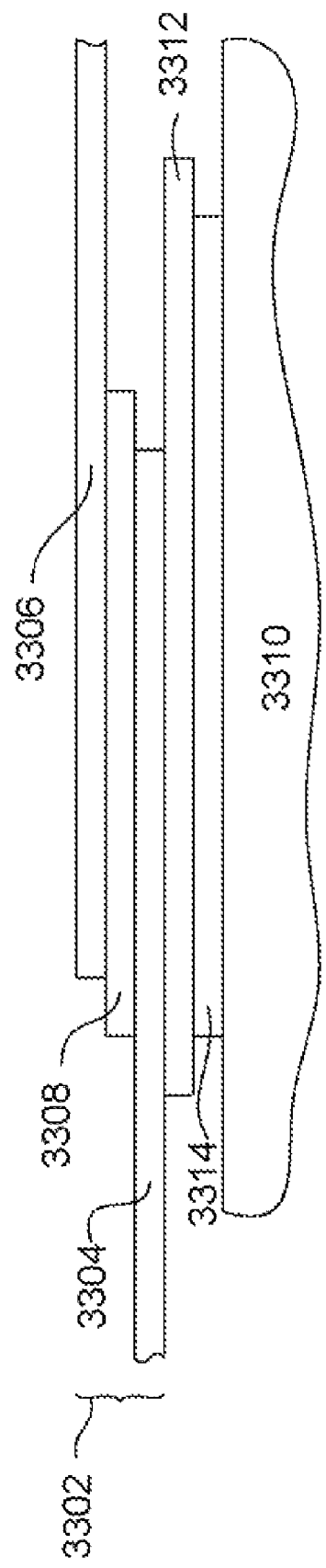
FIG. 33 is a view taken from line 33-33 of FIG. 32.

With reference now to FIGS. 32 and 33, a possible structure for a laser activated PCR resistor is described. A PCR resistor 3302 includes first and second (or top and bottom) electrodes 3304, 3306 with a layer of Phase Change Resistor (PCR) material 3308 sandwiched between the first and second electrodes 3304, 3306. The PCR resistor 3302 is built upon a substrate 3310 that is preferably the surface of the slider after the read and write heads have been fabricated. A layer of insulation 3312 can be provided beneath the PCR resistor 3302, which can be alumina. In addition, a reflective layer 3314 may be provided beneath the PCR resistor and the insulator 3312 if provided. The reflective layer can be, for example, Au and protects the underlying read and write head structures from damage during the laser induced activation switching of the resistor 3302.

Switching the PCR 3302 to its amorphous, high resistance state is accomplished by directing a focused laser at the PCR 3302, which heats the PCR with a short set of pulses that heat and rapidly cool (quench) the PCR material 3308. To set the PCR to its crystalline, low resistance state, a longer lower power set of pulses are applied to allow the PCR material 3308 to anneal to its crystalline state.

Even a single laser activated PCR 3302 would be large, on the order of 25 to 100 microns square. Therefore, the PCR structure 3302 is preferably built upon a layer above the major elements of the head, since these elements consume most of the available area, and would block the laser access to the PCR 3302. Furthermore, it is likely to require an even larger area of laser-reflective material 3312 beneath the PCR to protect the head from being heated by an oversized or slightly misdirected laser beam. After the head has been tested and assembled into a head gimbal assembly when ESD protection is no longer needed, the lead lines to the sensor and/or TFC pads can be cut by laser deletion as previously described.

In the discussion of the above described embodiments, laser deletion has been described as a means for permanently deactivating the ESD shunt structure after testing has been completed. It is also possible, however, for some of the structures and resistors described herein, to sever the leads to the ESD shunt structure by other means such as by a fuse method. Using such a method, an electrical current can be passed through the leads that is sufficiently high to melt locally melt the leads. The leads can be configured with a section that is narrower than other sections to localize the melting of the leads to the narrower section.

While various embodiments have been described above, it should be understood that they have been presented by way of example only, and not limitation. Other embodiments felling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A structure for preventing electrostatic discharge damage to a magnetoresistive sensor, the structure comprising:
   a slider;
   a magnetoresistive sensor formed on the slider, the magnetoresistive sensor being connected with first and second leads;
   a relay formed on the slider, the relay including first and second programmable resistors, the first programmable resistor being connected with the first lead and the second programmable resistor being connected with the second lead, the first and second programmable resistors being biased in a closed circuit state when no current flows through the relay and functional to open while current flows through the relay; and
   circuitry configured to apply a current to each of the first and second programmable resistors to switch the programmable resistors while simultaneously shunting the first and second leads to prevent current from flowing through the magnetoresistive sensor.

2. The structure as in claim 1 wherein the circuitry, for connecting the relay circuit to the sensor has been severed to form an open circuit.

3. The structure as in claim 1 wherein the relay is connected with circuitry arranged to provide electrical connection between the sensor and the relay, at least a portion of the circuitry having been severed by laser deletion.

* * * * *